(12) United States Patent
Shin et al.

(10) Patent No.: US 11,216,655 B2
(45) Date of Patent: Jan. 4, 2022

(54) ELECTRONIC DEVICE AND CONTROLLING METHOD THEREOF

(71) Applicant: Samsung Electronics Co., Ltd., Gyeonggi-do (KR)

(72) Inventors: Hoseon Shin, Gyeonggi-do (KR); Chulmin Lee, Gyeonggi-do (KR); Gajin Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/738,030

(22) Filed: Jan. 9, 2020

(65) Prior Publication Data

US 2020/0226356 A1 Jul. 16, 2020

(30) Foreign Application Priority Data

Jan. 10, 2019 (KR) .................. 10-2019-0003247

(51) Int. Cl.
*G06K 9/00* (2006.01)
*B25J 13/00* (2006.01)
(Continued)

(52) U.S. Cl.
CPC ........ *G06K 9/00335* (2013.01); *B25J 13/003* (2013.01); *G05D 1/0246* (2013.01);
(Continued)

(58) Field of Classification Search
CPC ........... G06K 9/00335; G06K 9/00288; G05D 1/0246; G06T 7/20; G06T 2207/10;
(Continued)

(56) References Cited

U.S. PATENT DOCUMENTS 9,201,425 B2 12/2015 Yoon et al.
9,639,084 B2 5/2017 Nakamura et al.
(Continued)

FOREIGN PATENT DOCUMENTS

CN 105959872 A 9/2016
EP 3336687 A1 6/2018
(Continued)

OTHER PUBLICATIONS

Machine translation for JP 2016-251266, IDS (Year: 2016).*
(Continued)

*Primary Examiner* — Qian Yang
(74) *Attorney, Agent, or Firm* — Cha & Reiter, LLC

(57) ABSTRACT

An electronic device and method are disclosed. The device includes a housing, at least one camera, a plurality of microphones configured to detect a direction of a sound source, at least one driver operable to rotate and/or move at least part of the housing, a wireless communication circuit, a processor operatively connected to the camera, the microphones, the driver, and the wireless communication circuit, and a memory. The processor implements the method, including: receiving a user utterance, detect a first direction from which the user utterance originated, control the driver to rotate and/or move towards the first direction, a first image scan for the first direction and analyze the image for a presence of a user, when the user is not detected, rotate and/or move the at least part of the housing in a second direction, and perform a second image scan.

10 Claims, 18 Drawing Sheets

(51) Int. Cl.
*G05D 1/02* (2020.01)
*G06T 7/20* (2017.01)
*G10L 25/48* (2013.01)
*G10L 17/00* (2013.01)

(52) U.S. Cl.
CPC .............. *G06T 7/20* (2013.01); *G10L 17/00* (2013.01); *G10L 25/48* (2013.01); *G06T 2207/10* (2013.01); *G06T 2207/30196* (2013.01)

(58) Field of Classification Search
CPC .......... G06T 2207/30196; G06N 3/008; H04R 2201/401; H04R 2201/025; H04R 1/32; H04R 1/326; H04R 1/406; G06F 3/011; G06F 3/012; G06F 3/167; B25J 11/0005; B25J 13/003; H04N 5/2252; H04N 5/23206; H04N 5/23299; G10L 17/22; G10L 17/00; G10L 25/48; G10L 15/22
See application file for complete search history.

(56) References Cited

U.S. PATENT DOCUMENTS

| 10,504,515 | B2 | 12/2019 | Chih et al. |
| 2007/0150108 | A1 | 6/2007 | Yokoyama et al. |
| 2017/0206900 | A1 | 7/2017 | Lee et al. |
| 2018/0133900 | A1 | 5/2018 | Breazeal et al. |
| 2018/0152784 | A1 | 5/2018 | Kim et al. |
| 2018/0174584 | A1* | 6/2018 | Chih .................. G06F 3/167 |
| 2019/0184567 | A1 | 6/2019 | Hayashi |

FOREIGN PATENT DOCUMENTS

| JP | 2002-323900 A | 11/2002 |
| JP | 2004-283927 A | 10/2004 |
| JP | 2006-0251266 A | 9/2006 |
| JP | 2009-222969 A | 10/2009 |
| JP | 6157598 B2 | 7/2017 |
| WO | 2018/043235 A1 | 3/2018 |

OTHER PUBLICATIONS

International Search Report dated Apr. 23, 2020.
European Search Report dated Apr. 28, 2020.
European Search Report dated Jul. 15, 2020.

* cited by examiner (a) Multi-DOA output with 1 source(0°)

(b) Multi-DOA output with 2 source(-30°, 90°)

(c) Multi-DOA output with 3 source(-30°, 90°, -150°)

ELECTRONIC DEVICE AND CONTROLLING METHOD THEREOF

CROSS-REFERENCE TO RELATED APPLICATION(S)

This application is based on and claims priority under 35 U.S.C. § 119 to Korean Patent Application No. 10-2019-0003247, filed on Jan. 10, 2019, in the Korean Intellectual Property Office, the disclosure of which is incorporated by reference herein its entirety.

BACKGROUND

1. Field

The disclosure relates to an electronic device, which receives an input from a user and then operates, and a technology for the electronic device.

2. Description of Related Art

With the development of the technology associated with electronic devices, various smart devices have proliferated in distribution and usage. For example, various robots are now popular consumer products, including as robot vacuum cleaners, dancing or animatronic robots (e.g., that move to music and/or a user's voice), "pet" robots that mimic animal behavior.

Electronic devices may include an input device for receiving a user input. When the electronic device receives the input through the input device, the electronic device may provide a service to the user by interpreting the received input and then performing an operation according to the interpreted result.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that recognizes a user and then is capable of moving to face the user.

Furthermore, another aspect of the disclosure is to provide an electronic device capable of accurately and quickly facing the user.

In accordance with an aspect of the disclosure, an electronic device may include housing, at least one camera disposed in the housing, a plurality of microphones disposed to detect a direction of a sound source, at least one driving part connected to or disposed in the housing to rotate and/or move at least part of the housing, a wireless communication circuit disposed within the housing, a processor operatively connected to the camera, the microphones, the driving part, and the wireless communication circuit, and a memory operatively connected to the processor. The memory may store instructions that, when executed, cause the processor to receive a user utterance using the plurality of microphones, detect a first direction from which the user utterance originated, based on at least part of the user utterance, control the driver to rotate and/or move at least part of the housing towards the first direction, after the rotation and/or the movement towards the first direction, perform a first image scan for the first direction, by capturing an image using the camera while the camera is oriented in the first direction and analyzing the image for a presence of a user, when the user is not detected in the image, control the driver to rotate and/or move the at least part of the housing in a second direction, and perform a second image scan for the second direction.

In accordance with another aspect of the disclosure, an electronic device may include a housing, at least one camera disposed in the housing, a plurality of microphones disposed to detect a direction of a sound source, at least one driving part connected to or disposed in the housing to rotate and/or move at least part of the housing, a processor operatively connected to the camera, the microphones, and the driving part, and a memory operatively connected to the processor. The memory may store instructions that, when executed, cause the processor to receive a user utterance using the plurality of microphones, detect a first direction from which the user utterance originated based on at least part of the user utterance, control the driver to rotate and/or move at least part of the housing towards the first direction, after the rotation and/or the movement towards the first direction, perform an image scan for the first direction, by capturing an image using the camera, detect a second direction based on at least part of the image, and control the driver to rotate and/or move at least part of the housing towards the second direction.

In accordance with another aspect of the disclosure, a method for controlling an electronic device may include receiving a user utterance using a plurality of microphones, rotating and/or moving, by a driver, at least part of the electronic device towards a first direction from which the user utterance is detected, based on at least part of the user utterance, after rotating and/or the moving towards the first direction, performing a first image scan in the first direction using a camera, when a user of the user utterance is not detected in the first direction by the first image scan, rotating and/or moving, by the driver, at least part of the electronic device in a second direction, and performing a second image scan in the second direction using the camera.

In accordance with another aspect of the disclosure, a method for controlling an electronic device may include receiving a user utterance using a plurality of microphones, rotating and/or moving, by a driver, at least part of the electronic device towards a first direction from which the user utterance is detected based on at least part of the user utterance, after rotating and/or moving towards the first direction, performing an image scan including capturing an image in the first direction, using a camera, and rotating and/or moving, by the driver, at least part of the electronic device in a second direction determined based on at least part of the image.

In accordance with another aspect of the disclosure, a computer-readable recording medium may store a computer program causing an electronic device to perform receiving a user utterance, using a plurality of microphones, rotating and/or moving at least part of the electronic device in a first direction determined based on at least part of the user utterance, performing a first image scan in the first direction, using the camera after the rotation and/or the movement in the first direction, rotating and/or moving at least part of the electronic device in a second direction when a user of the user utterance is not detected in the first direction, and performing a second image scan in the second direction.

In accordance with another aspect of the disclosure, a computer-readable recording medium may store a computer program causing an electronic device to perform receiving a user utterance, using a plurality of microphones, rotating and/or moving at least part of the electronic device in a first direction determined based on at least part of the user utterance, performing an image scan in the first direction, using the camera after the rotation and/or the movement in the first direction, and rotating and/or moving at least part of the electronic device in a third direction determined based on at least part of an image obtained through the image scan.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure will be described with reference to accompanying drawings. However, those of ordinary skill in the art will recognize that modification, equivalent, and/or alternative on certain embodiments described herein can be variously made without departing from the disclosure.

Figure 1:
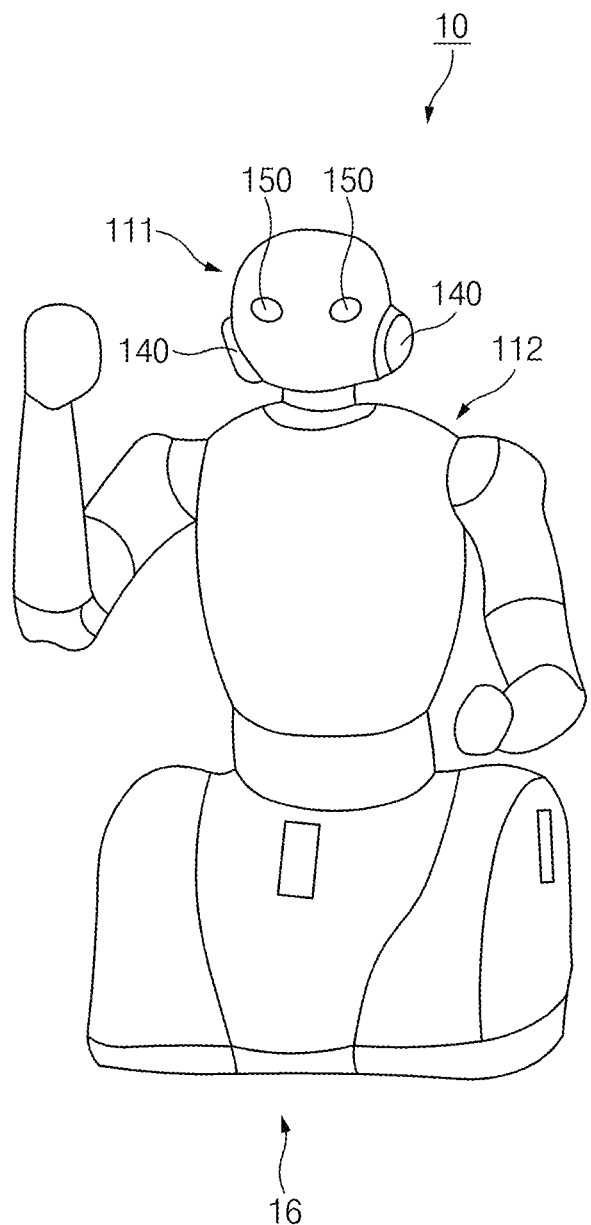
FIG. 1 is a view illustrating an example of an appearance of an electronic device, according to an embodiment.

FIG. 1 is a view illustrating an example of an appearance of an electronic device 10, according to an embodiment.

The electronic device 10 according to an embodiment may include housing including a head portion 111 and a body portion 112. Herein, the head portion 111 may be rotatably connected about the body portion 112. Alternatively, the head portion 111 may be otherwise moveably connected to the body portion 112. Alternatively, the head portion 111 may be connected to be rotatable and movable with respect to the body portion 112. However, the configuration of the housing illustrated in FIG. 1 is to describe only one example; the shape of the housing may be variously modified depending on the embodiment. For example, the housing is integrally formed without distinguishing the head portion 111 and the body portion 112, or the head portion 111 may be fixedly connected to the body portion 112.

The electronic device 10 may include at least one camera 150 capable of shooting a still image or a video. According to an embodiment, the camera 150 may be disposed to capture an image in the direction in which the head portion 111 is oriented. For example, the electronic device 10 may track a user using the cameras, which may simulate an experience in which the electronic device 10 (e.g., the robot) is watching the user, leveraging the shape of the eyes mounted in the head portion 111 or the device, or alternatively by outputting the images or icons shaped like eyes through a display device. Herein, the direction in which the head portion 111 faces may mean the direction in which the shape of eyes included in the head portion 111 or output watches a user. The electronic device 10 according to an embodiment may detect the location of the user, using the image obtained through the camera 150. However, an operation of detecting the location of the user by using the result of analyzing an image needs a great amount of computations, thereby slowing an operation in which the electronic device 10 moves to search for the location of the user.

Furthermore, the electronic device 10 according to an embodiment may include a plurality of microphones 140 capable of receiving a sound signal. Referring to FIG. 1, the plurality of microphones 140 may be disposed in the head portion 111. However, according to another embodiment, the microphones 140 may be provided at another location of the housing. For example, the microphones 140 may be disposed in the body portion 112.

The electronic device 10 according to an embodiment may detect the location of a sound source, based on the sound signal received through the microphones 140. However, when the received sound signal includes a large amount of noises or the magnitude of the sound signal corresponding to a user utterance is small, it is difficult to accurately detect the location of the sound source detected based on the sound signal received through the microphones 140.

Moreover, the electronic device 10 according to an embodiment may include a driving body for moving the housing on a bottom surface 16. In this specification, the term 'moving' an object includes not only the case where the object's location is moved but also the case where the object rotates. The driving body may be implemented variously depending on embodiments. For example, the driving body may include one or more wheels supporting and moving the housing. For another example, the driving body may be implemented in the shape of a leg including a joint.

Figure 2:
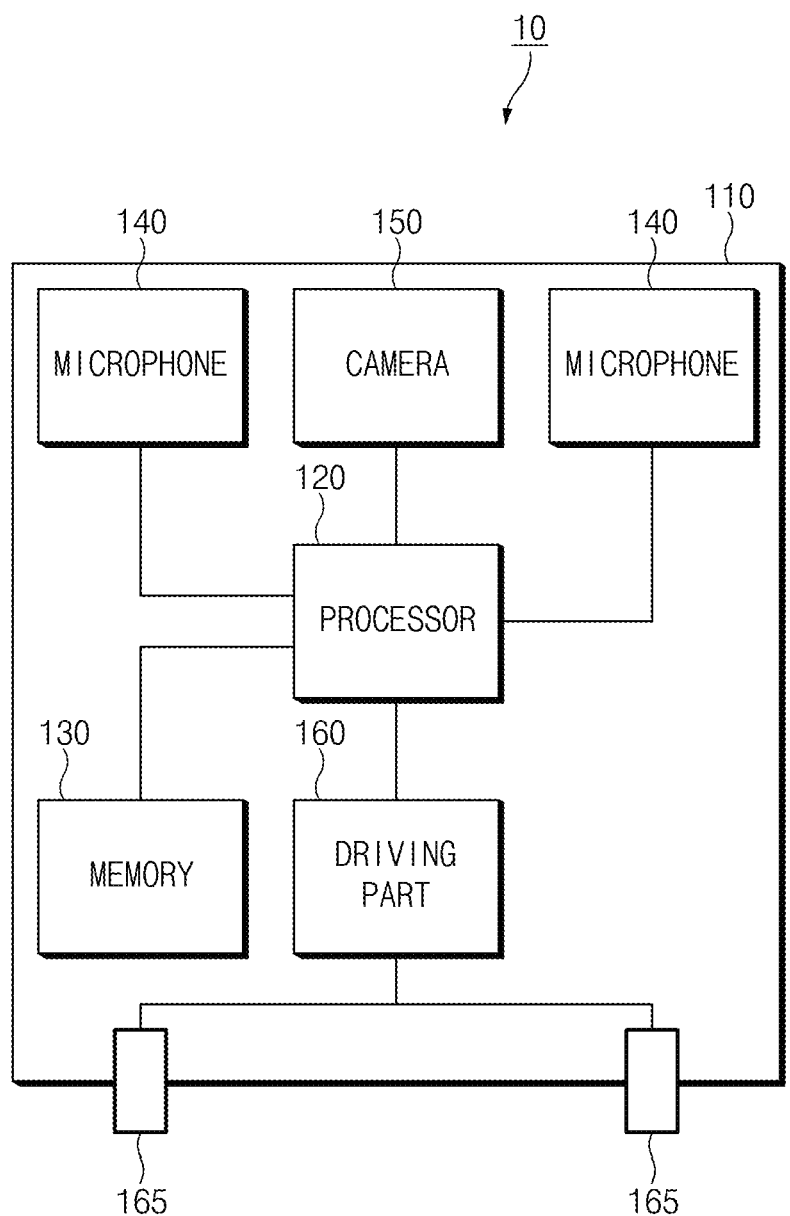
FIG. 2 is a block diagram illustrating a structure of an electronic device, according to an embodiment.

FIG. 2 is a block diagram illustrating a structure of the electronic device 10, according to an embodiment.

The electronic device 10 according to an embodiment may include housing 110 and may include a processor 120, a memory 130, a plurality of microphones 140, the camera 150, and the driving part 160 inside or outside the housing 110.

The memory 130 may store a program including instructions capable of being executed by the processor 120. When executed, the instructions may cause the processor 120 to process information or to perform the operations the electronic device 10 by controlling the components of the electronic device 10.

According to an embodiment, the processor 120 may receive a user utterance, using the microphones 140. Moreover, the processor 120 may detect the direction (or the first direction) of the sound source (e.g., a direction from which the user utterance was generated, relative to the robot), based on at least part of the received user utterance. The microphones 140 may be disposed to detect the direction of the sound source in which the received sound signal occurs. For example, the microphones 140 may be respectively disposed at locations spaced apart from one another. In this case, the processor 120 may perform a Direction of Arrival estimation (DOA) process, based on the difference in reception delay between sound signals received by the microphones 140.

When executed, the instructions stored in the memory 130 may cause the processor 120 to control the driving part 160 such that the housing 110 moves in the first direction when the first direction is determined based on a user utterance. According to an embodiment, the driving part 160 may include a driving body 165. The driving part 160 may drive the driving body 165 to move the housing 110 under the control of the processor 120. For example, the driving part 160 may rotate a wheel, using a motor included in the driving part 160.

The processor 120 may move at least part of the housing 110 in the first direction and then may perform an image scan (or a first image scan), using the camera 150. The processor 120 may attempt the detection of the user from the image obtained by performing the first image scan. Herein, the processor 120 may determine whether an object corresponding to the shape of the user is present in the image. For example, the processor 120 may extract first feature information from an image and then may determine whether the extracted first feature information includes second feature information that the facial image of the user has.

When the result of performing the first image scan indicates the user is not detected in the first direction, the processor 120 may control the driving part 160 so as to move at least part of the housing 110 in the second direction. For example, the second direction may be a direction set to a default value such as a clockwise direction. For another example, the second direction may be a direction determined based on the user utterance additionally received using the microphones 140.

Also, the processor 120 may perform an image scan (or a second image scan) in the second direction, using the camera 150. According to an embodiment, the processor 120 may continuously perform the second image scan while controlling the driving part 160 such that the housing 110 moves in the second direction. The processor 120 may attempt to detect the user from the image obtained through the second image scan. When it is determined, based on the image obtained through the second image scan, that the user is located at a specific location within the image (e.g., the center of the image), the processor 120 may control the driving part 160 such that the movement of the housing 110 is stopped. Alternatively, according to another embodiment, after completing the movement of the housing 110 in the second direction, the processor 120 may repeatedly perform an operation of performing the second image scan, until the user is detected or the specified number of times.

According to an embodiment, when moving in the first direction determined based on a user utterance, the processor 120 may control the driving part 160 such that the housing 110 moves at the first speed; when moving in the second direction while performing the image scan, the processor 120 may control the driving part 160 such that the housing 110 moves at the second speed. The first speed may be the speed (or the second speed is the speed less than the first speed) faster than the second speed. Throughout this specification, 'speed' may be a term indicating a concept including at least one of linear velocity and angular velocity.

That is, the electronic device 10 may primarily detect the location of the user based on the sound signal received using the microphones 140 and then may secondarily detect the location of the user based on the image obtained using the camera 150. Accordingly, the electronic device 10 according to an embodiment may accurately and quickly detect the location of the user and may move.

Figure 3:
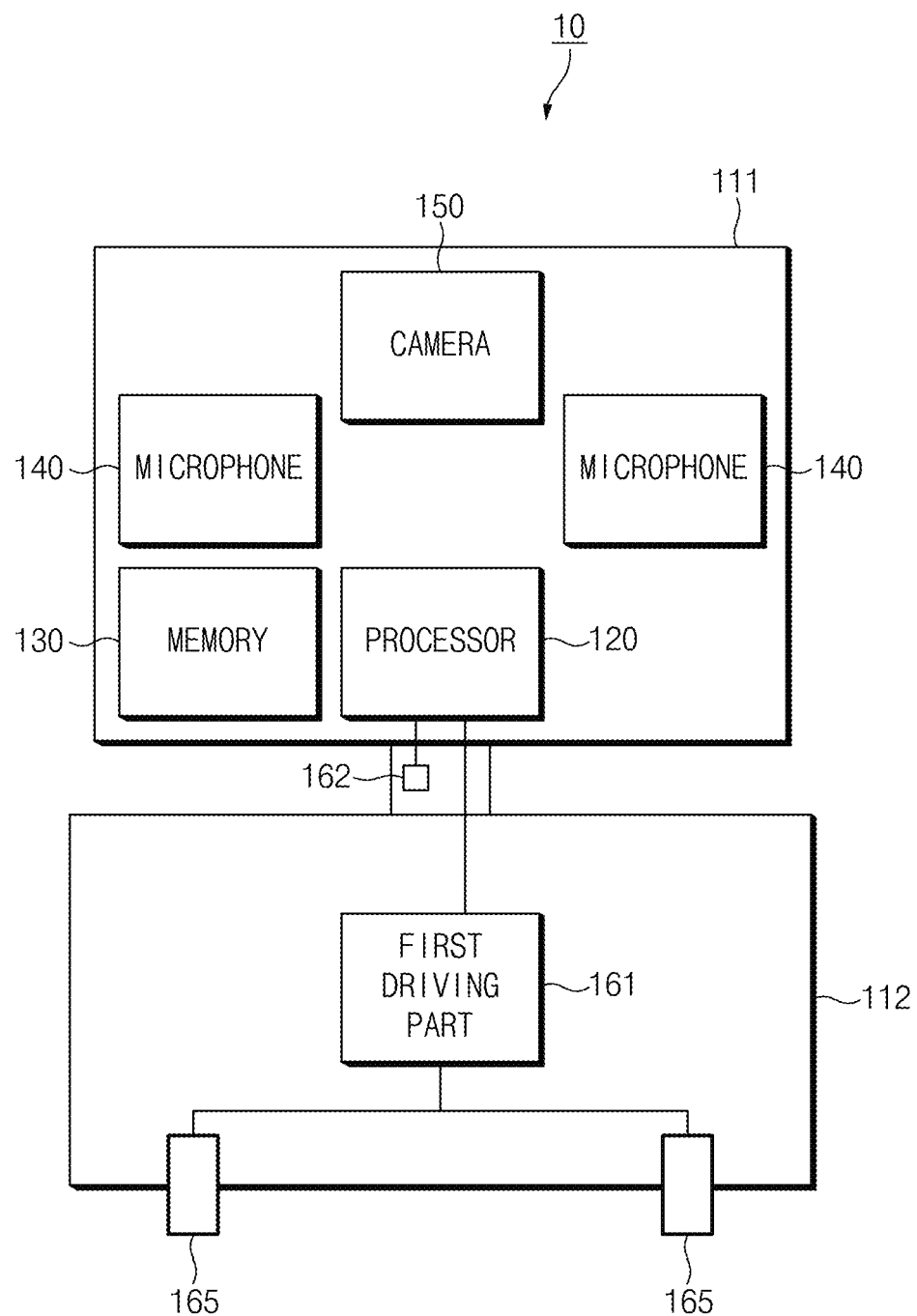
FIG. 3 is a block diagram illustrating a structure of an electronic device, according to another embodiment.

According to another embodiment, the housing 110 of the electronic device 10 may be implemented with the combination of a plurality of portions. FIG. 3 is a block diagram illustrating a structure of the electronic device 10, according to another embodiment.

According to another embodiment, the electronic device 10 may include the housing 110 including the head portion 111 and the body portion 112. Referring to FIG. 3, the head portion 111 may include the processor 120, the memory 130, the microphones 140, and the camera 150. Furthermore, the body portion 112 may include a first driving part 161. However, FIG. 3 is to describe an embodiment; in FIG. 3, the component provided in the head portion 111 may be provided in the body portion 112, or the component provided in the body portion 112 may be provided in the head portion 111. For example, the microphones 140 may be installed in the body portion 112.

The head portion 111 may be connected to be movable with respect to the body portion 112. For example, the head portion 111 may be connected to the joint of the body portion 112 so as to move or rotate. According to an embodiment, the driving part 160 may be provided in the electronic device 10 as the first driving part 161 and second driving part 162; the processor 120 may control the second driving part 162 to move the head portion 111. For example, the second driving part 162 may include a motor for operating the connection portion between the head portion 111 and the body portion 112.

When executed, the instructions stored in the memory 130 may cause the processor 120 to control the first driving part 161 such that the housing 110 moves in the first direction when the first direction is determined based on a user utterance. According to an embodiment, the first driving part 161 may include the driving body 165. The first driving part 161 may drive the driving body 165 to move the housing 110 under the control of the processor 120. For example, the first driving part 161 may rotate a wheel, using a motor included in the first driving part 161.

The processor 120 may move at least part (e.g., the body portion 112) of the housing 110 in the first direction and then may perform the image scan, using the camera 150. The processor 120 may attempt the detection of the user from the image obtained by performing the image scan. Herein, the processor 120 may determine whether an object corresponding to the shape of the user is present in the image. For example, the processor 120 may extract first feature information from an image and then may determine whether the extracted first feature information includes second feature information that the facial image of the user has.

When the result of performing the image scan indicates that a user is detected in the first direction, the processor 120 may determine the direction (or a third direction) of the detected user depending on the location at which the user is detected in an image. For example, the processor 120 may recognize one or more faces within the obtained image as the result of performing the image scan. Afterward, the processor 120 may detect the user's face corresponding to the user utterance among the recognized one or more faces. The processor 120 may determine the direction in which the housing is to be moved such that the detected user's face is located at the center in an image, as the third direction.

Herein, the user corresponding to a user utterance may be the registered user to detect the user's face corresponding to the user utterance. For example, voice feature information indicating the feature of the user's voice and face feature information indicating the feature of the user's face may be stored in the memory 130 while being associated with each other. The processor 120 may extract the voice feature information from the received user utterance and may search for the face feature information stored in the memory 130, using the extracted voice feature information. The processor 120 may detect a face having a feature corresponding to the found face feature information among one or more faces recognized in the image, as the user's face. Alternatively, for another example, the voice feature information indicating the feature of the user's voice and the face feature information indicating the feature of the user's face may be registered in an external server. The processor 120 may transmit the voice feature information extracted from the user utterance, to the external server and may receive the face feature information as a response.

The processor 120 may control the driving part of the electronic device 10 such that at least part of the housing of the electronic device 10 is moved in the third direction. Herein, the processor 120 may update the third direction while continuously performing the image scan and may control the driving part of the electronic device 10 such that at least part of the housing of the electronic device 10 is moved in the updated third direction.

Because the head portion 111 is installed on the body portion 112, the head portion 111 may move together when the body portion 112 is moved by the driving body 165. However, the head portion 111 may be moved independently of the movement of the body portion 112 by the operation of the second driving part 162. Accordingly, according to an embodiment, when the processor 120 moves at least part of the housing in the first direction determined based on a user utterance, the processor 120 may control the first driving part 161 to move the head portion 111 and the body portion 112 together. Furthermore, when the processor 120 moves at least part of the housing in the third direction determined based on the image scan, the processor 120 may control the second driving part 162 to move the head portion 111 separately from the body portion 112.

Herein, when moving in the first direction, the processor 120 may control the first driving part 161 such that the body portion 112 is moved at the first speed. In addition, when moving in the third direction, the processor 120 may control the second driving part 162 such that the head portion 111 is moved at the second speed. According to an embodiment, the first speed may be faster than the second speed.

Figure 4:
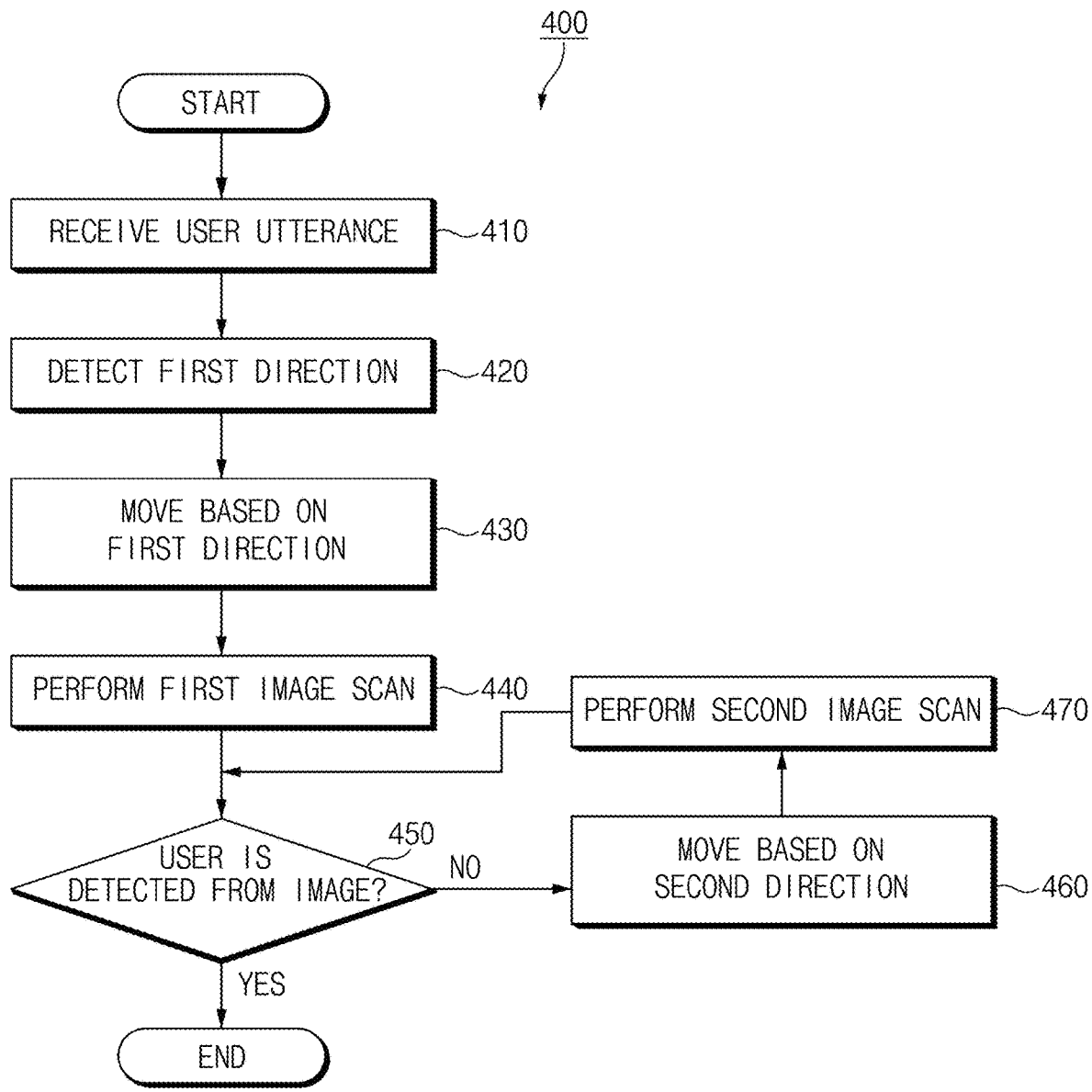
FIG. 4 is a flowchart illustrating a process in which an electronic device operates to face a user, according to an embodiment.

FIG. 4 is a flowchart 400 illustrating a process in which the electronic device 10 operates to face a user, according to an embodiment.

First of all, the electronic device 10 may perform operation 410 including receiving a user utterance through the plurality of microphones 140 (e.g., receiving a voice input). Afterward, the electronic device 10 may perform operation 420 of detecting the first direction based on at least part of the received user utterance (e.g., detecting a direction from which the user utterance originated from and was detected).

According to an embodiment, in operation 410, the electronic device 10 may determine at least one direction based on the received user utterance, based on the Multi-DOA algorithm. Also, the electronic device 10 may calculate a reliability of the determined at least one direction. Thus, in embodiments where a plurality of possible directions are determined, the electronic device 10 may select as the first direction a direction from among the plurality that is associated with a highest reliability among the plurality of directions.

Figure 5:
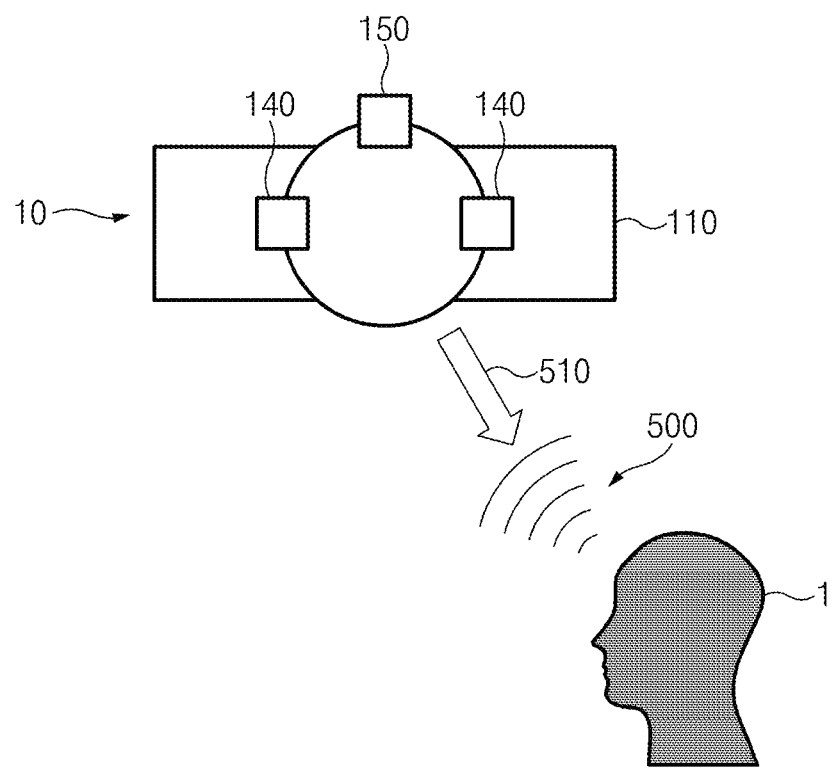
FIG. 5 is a conceptual diagram for describing an operation in which an electronic device receives a user utterance, according to an embodiment.

Herein, referring to FIG. 5, the electronic device 10 may receive a user utterance 500 generated by a user 1, through the plurality of microphones 140. The electronic device 10 receiving the user utterance 500 may detect a direction 510 in which the user utterance 500 is received, as the first direction.

Afterward, the electronic device 10 may perform an operation 430 including executing a movement based on the first direction. For example, the electronic device 10 may rotate and/or move at least part of the housing of the electronic device 10, such that the camera(s) 150 included in the electronic device 10 are moved as to orient towards the first direction (e.g., "face" the first direction).

Afterward, the electronic device 10 may perform operation 440 including executing a first image scan based on the first direction. That is, the electronic device 10 may capture an image, using the camera 150 while the camera 150 is oriented towards the first direction. In some embodiments, the electronic device 10 may perform an image recognition process on the obtained image.

Figure 6:
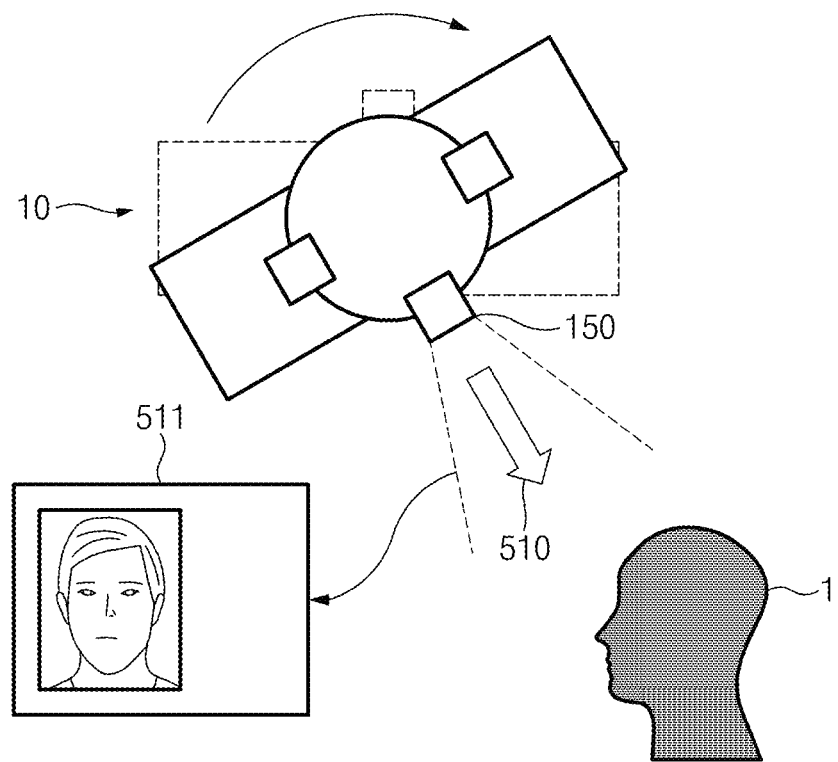
FIG. 6 is a conceptual diagram for describing an operation in which an electronic device receiving a user utterance moves and/or rotates, according to an embodiment.

Herein, as illustrated in FIGS. 5 and 6, the electronic device 10 may move at least part of the housing 110 such that the camera 150 is oriented towards the detected first direction 510. The electronic device 10, after moving at least part of the housing 110, may obtain an image 511 using the camera 150 capturing the user 1, who is positioned in the first direction 510. However, when the user 1 moves while the electronic device 10 moves at least part of the housing 110 or when there is an error in the detection of the first direction 510, an error may occur in which the user 1 may not be captured in the image 511.

Afterward, the electronic device 10 may perform operation 450 including determining whether a user is detected within the obtained image. According to an embodiment, the electronic device 10 may determine whether the user utterance received in operation 410 is the voice of the registered user. For example, voice feature information extracted from the received user utterance may be found from the information stored in the electronic device 10. When the information matched with the extracted voice feature information is found, the electronic device 10 may search for image feature information (e.g., face feature information) stored in association with the voice feature information. When the image feature information is found, in operation 450, the electronic device 10 may detect an object matched with the found image feature information within the image.

According to another embodiment, in operation 450, the electronic device 10 may detect an object having the feature of the shape of a human within the image. When the object is detected, the electronic device 10 may determine that a user is detected in the image.

When the user is not detected as present in the image in operation 450, the electronic device 10 may move in a second direction. According to an embodiment, when a plurality of directions and the reliability of each direction are predicted based on the Multi-DOA process, the electronic device 10 may determine that the direction of the next highest reliability after the previously selected first direction is the second direction. According to another embodiment, moving in the second direction may mean moving in the determined direction from the first direction. For example, moving in the second direction may mean moving in the clockwise direction from the first direction. According to still another embodiment, the second direction may mean a direction within a predetermined angle from the first direction.

After performing operation 450 moving in the second direction, or while performing operation 450, the electronic device 10 may perform operation 470 including performing a second image scan. After performing the second image scan, the electronic device 10 may, in operation 450, re-determine whether a user is detected from the image captured in the second image scan.

Figure 7:
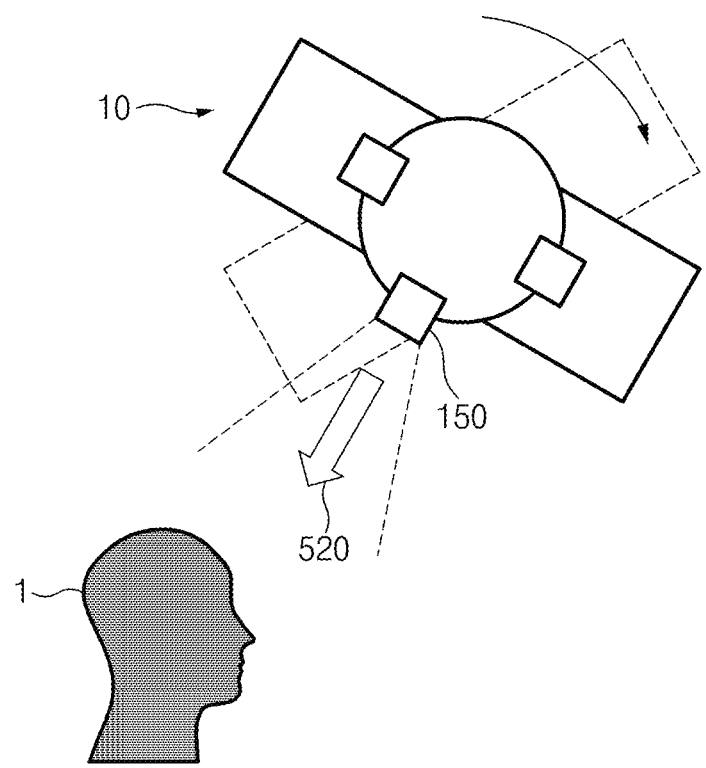
FIG. 7 is a conceptual diagram for describing an operation in which an electronic device performing an image scan moves and/or rotates, according to an embodiment.

Referring to FIG. 7, in order to capture the second image, the electronic device 10 may move in order to orient the camera 150 towards the second direction 520. When the user 1 is located within the second direction 520, and thus detected by the second image scan, the electronic device 10 may terminate the moving operations for the at least part of the housing.

Figure 8:
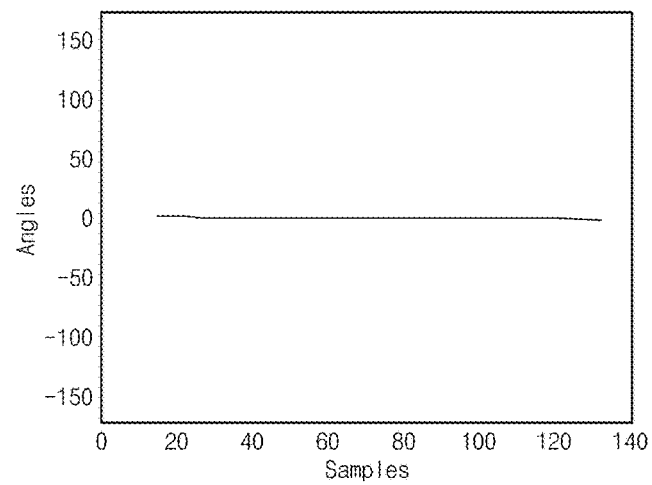
FIG. 8 is a graph illustrating an example for describing a method in which an electronic device detects a plurality of directions, according to an embodiment.
Figure 8:
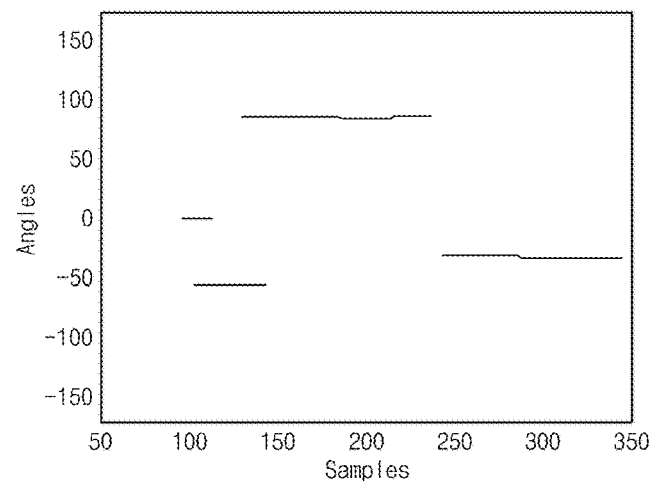
Figure 8:
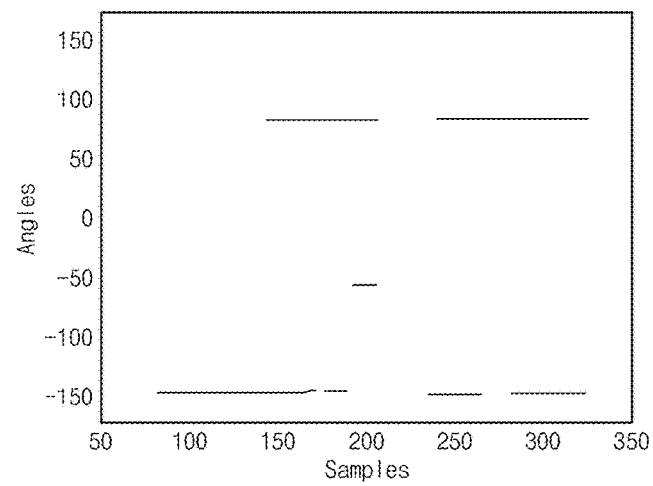

FIG. 8 is a graph illustrating an example describing a method in which an electronic device detects a plurality of directions, according to an embodiment.

FIG. 8 (a) is a graph illustrating the case where an output value indicates a single direction (0 angles) when the received utterance is entered into a multi-DOA process. When a single direction is detected, the electronic device 10 may move based on the first speed in the detected direction. The electronic device 10 moving in the detected direction may perform an image scan using the camera 150 and then may attempt to detect a user in the obtained image. When the user is not detected, the electronic device 10 may move in the predetermined direction (e.g., rotate in a clockwise direction) based on the second speed.

FIG. 8 (b) is a graph illustrating the case where an output value indicates two directions (−30 angles and 90 angles) when the received utterance is entered into the multi-DOA process. Furthermore, FIG. 8 (c) is a graph illustrating the case where an output value indicates three directions (−30 angles, 90 angles, and −150 angles) when the received utterance is entered into the multi-DOA process. The electronic device 10 may move based on the first speed in the direction of high reliability among a plurality of directions. The electronic device 10 moving in the detected direction may perform an image scan using the camera 150 and then may attempt to detect a user in the obtained image. When the user is not detected, the electronic device 10 may move based on the second speed in the direction of the second highest reliability.

According to an embodiment, the electronic device 10 may determine at least one of the first speed and the second speed, based on at least one of the reliability obtained by the DOA process, the strength of the voice of the received user utterance, Signal-to-Noise Ratio (SNR), and a confidence score. The confidence score may be a value indicating information in which a user utterance is matched with a predetermined word. For example, as the reliability, the strength of a voice, SNR, or the confidence score is higher, the electronic device 10 may determine that the first speed is a high value. Alternatively, as the score obtained as the result of performing speaker verification (SV) performed based on the received user utterance is higher, the electronic device 10 may determine that the first speed is a high value.

According to another embodiment, the electronic device 10 may determine the second speed depending on the number of frames per second utilized when the direction of the user is detected, using the image obtained using the camera 150. Alternatively, while moving in the second direction, the electronic device 10 may increase the second speed in the direction in which the object or background detected from the image obtained through the camera 150 is found.

According to still another embodiment, the electronic device 10 may calculate a value corresponding to the factors for determining the first speed. Herein, when the calculated value is not less than a threshold value, the electronic device 10 may skip the operation 440 to operation 470 of FIG. 4 that scan the image to detect the direction of the user.

Figure 9:
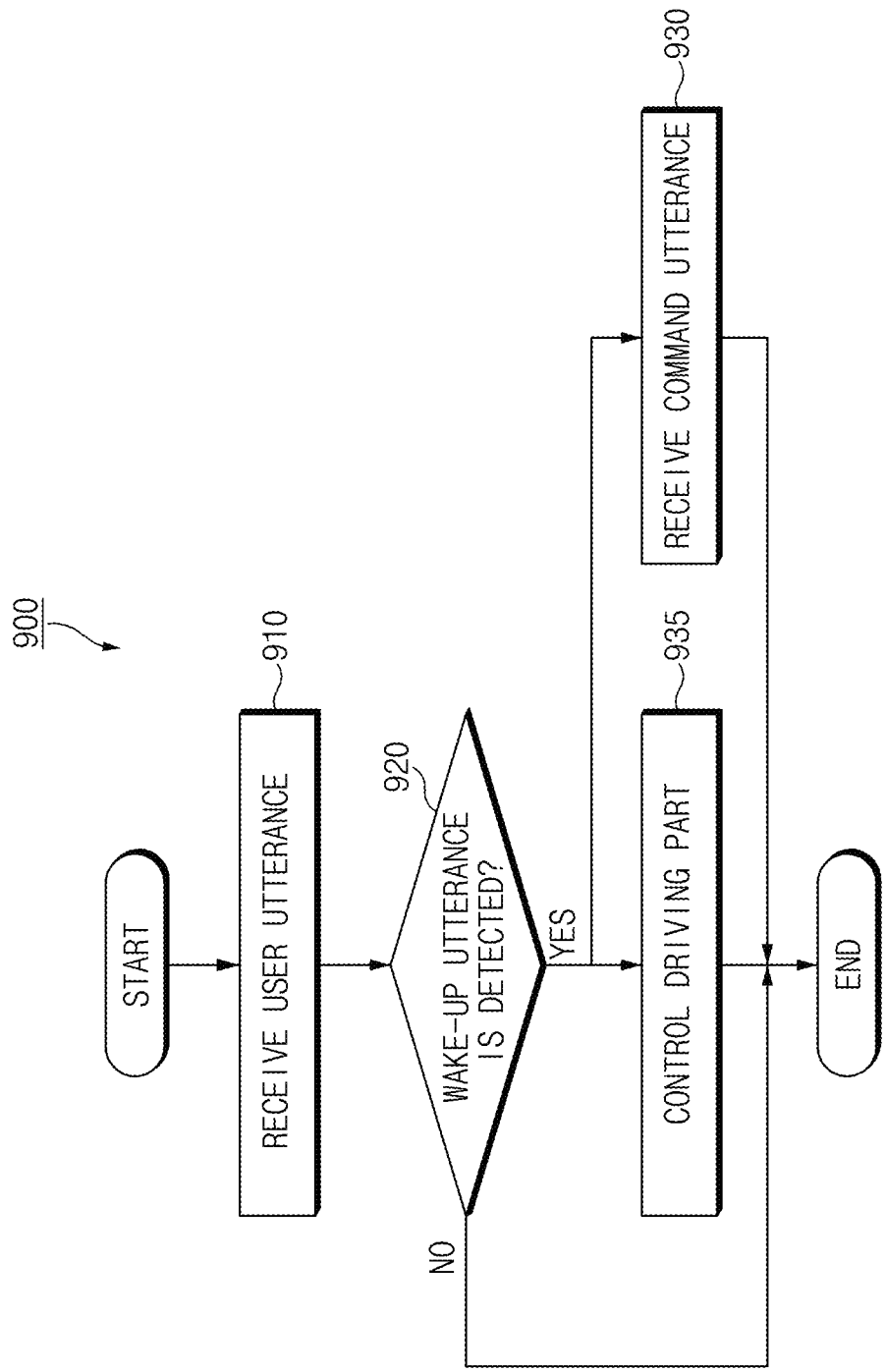
FIG. 9 is a flowchart illustrating a process in which an electronic device receives a command utterance of a user, according to an embodiment.

FIG. 9 is a flowchart 900 illustrating a process in which the electronic device 10 receives a command utterance of a user, according to an embodiment.

The electronic device 10 may perform operation 910 including receiving a user utterance through the microphones 140. When the electronic device 10 receives the user utterance, the electronic device 10 may perform operation 920 including determining whether a wake-up utterance is included in the received user utterance.

Certain prestored keywords or phrases may be associated with a wake-up command, which may awaken the electronic device 10 to be ready to receive a voice command. This may be beneficial in that the device may otherwise pick-up ambient noise and speech and misinterpret these phrases as commands, causing user inconvenience. Accordingly, the wake-up utterance means a voice signal that allows the electronic device 10 to be ready to receive a command utterance. For example, when receiving a voice signal for the word of 'Hi, Bixby' uttered by a user, the electronic device 10 may receive the voice signal received after 'Hi, Bixby' as the command utterance. Moreover, the command utterance may mean a voice signal for specifying an operation to be performed by the electronic device 10. For example, when a voice signal saying that 'let me know today's weather' is entered after a user utters the wake-up utterance, the electronic device may execute a process of searching for weather information and then outputting the weather information depending on the received voice signal.

According to an embodiment, when the wake-up command is detected as present in the utterance in operation 920, the electronic device 10 may, in operation 935, control the driving part 160 to move in the first direction as indicated by the direction from which the wake-up utterance was detected. Simultaneously, while the electronic device 10 moves, the electronic device 10 may perform operation 930, including receiving a command utterance. Herein, the first direction may be determined by performing the DOA process on the wake-up utterance.

Afterward, when the command utterance is received in operation 930, in operation 935, the electronic device 10 may control the driving part 160 to move in a second direction corresponding to another direction from which the command utterance was received, as determined from the command utterance.

Figure 10:
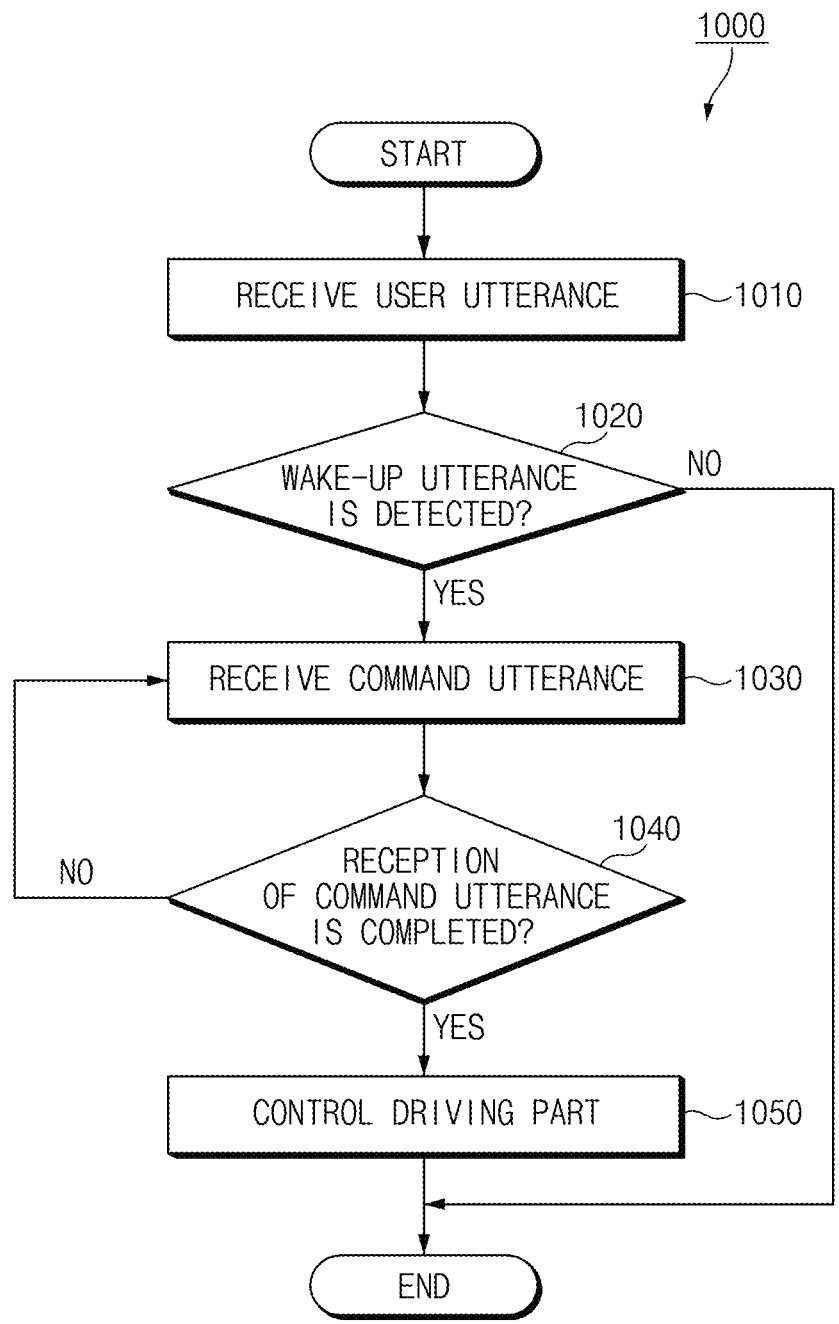
FIG. 10 is a flowchart illustrating a process in which an electronic device receives a command utterance of a user, according to another embodiment.

FIG. 10 is a flowchart 1000 illustrating a process in which the electronic device 10 receives a command utterance of a user, according to another embodiment.

As described in more detail in FIG. 9, the electronic device 10 may detect a user utterance and determine whether it includes a wake-up utterance in operation 1010 and operation 1020. When the wake-up utterance is detected, the electronic device 10 may perform operation 1030 including receiving a command utterance based on a voice signal received after the detected wake-up utterance.

Afterward, in operation 1040, the electronic device 10 may determine whether reception of the command utterance is complete. For example, when the utterance of the user is not received within a specified time, the electronic device 10 may perform operation 1040 of determining whether the reception of the command utterance is completed.

When the reception of the command utterance is completed, the electronic device 10 may perform operation 1050, including controlling the driving part 160 to move in the first direction, as determined based on at least one of the wake-up utterance and the command utterance.

Figure 11:
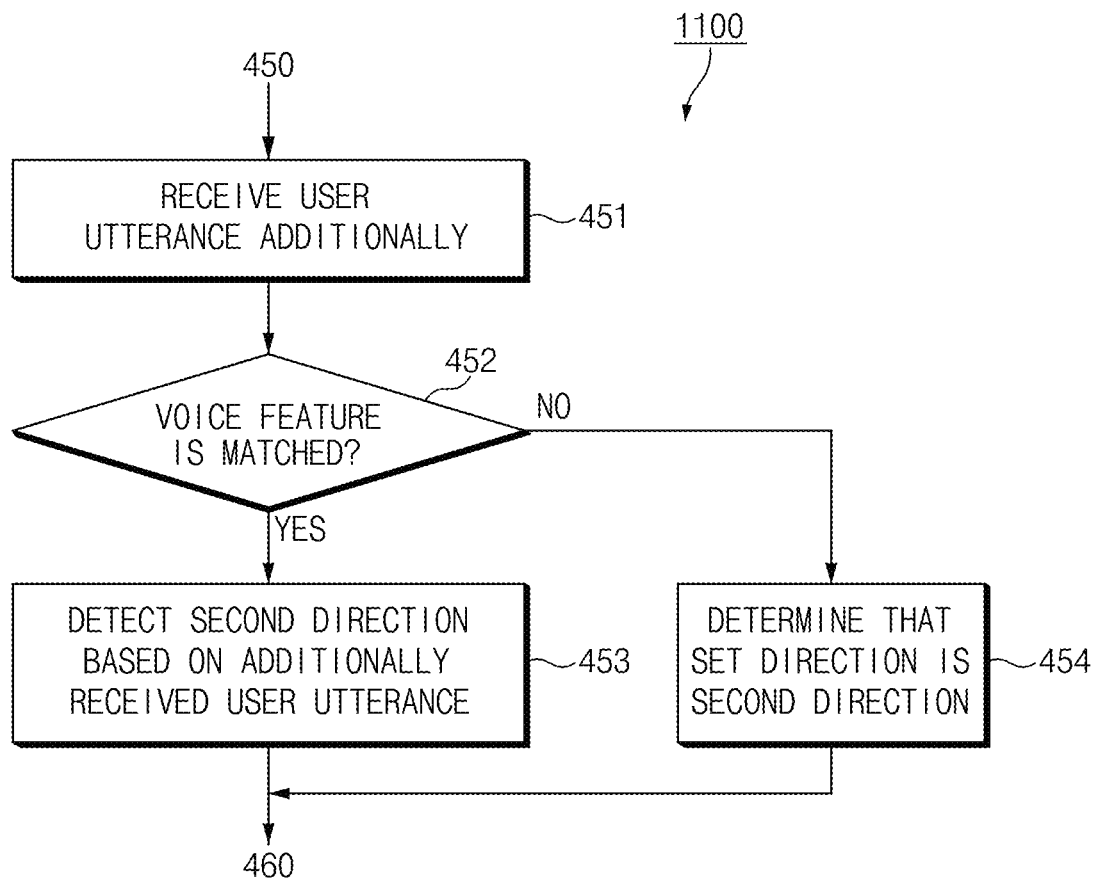
FIG. 11 is a flowchart for describing a process of determining a second direction when an image scan result indicates that a user is not detected, according to another embodiment.

FIG. 11 is a flowchart 1100 for describing a process of determining a second direction when an image scan result indicates that a user is not detected, according to another embodiment.

When a user is not detected in operation 450 of FIG. 4, according to an embodiment, the electronic device 10 may perform operation 451 including additionally receiving a user utterance. According to an embodiment, in operation 451, the electronic device 10 may further output a message prompting the user to speak an additional user utterance.

Accordingly, the electronic device 10 may additionally obtain the second voice feature from the additionally received user utterance. Moreover, the electronic device 10 may obtain the first voice feature from the user utterance received in operation 410. The electronic device may perform operation 452, including determining whether the first voice feature matches the second voice feature. Herein, when the voice feature is matched, it may be determined that a user who generates the user utterance received in operation 410 and a user who generates the user utterance additionally received in operation 451 are the same as each other. Accordingly, when the first voice feature matches with the second voice feature, the electronic device 10 may perform operation 453 of detecting the second direction from the additionally received user utterance.

When the voice feature is not matched, the electronic device 10 may perform operation 454 including determining that the set direction (e.g., the clock direction) is the second direction. After operation 453 or operation 454 is performed, the electronic device 10 may perform operation 460 of FIG. 4.

Figure 12:
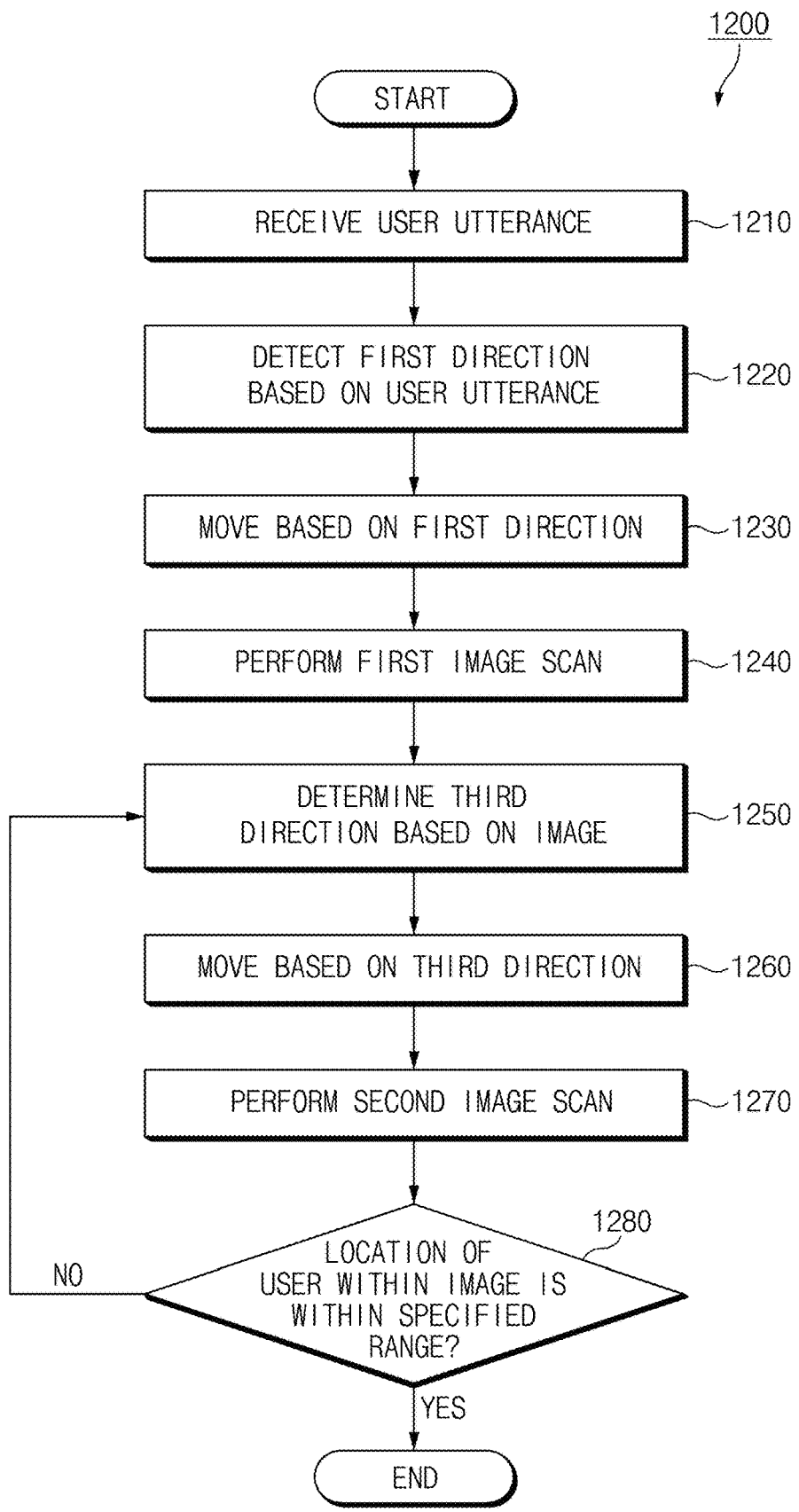
FIG. 12 is a flowchart illustrating a process in which an electronic device operates to face a user, according to another embodiment.

FIG. 12 is a flowchart 1200 illustrating a process in which the electronic device 10 operates to face a user, according to another embodiment.

The electronic device 10 may perform operation 1210 including receiving a user utterance through the plurality of microphones 140. Afterward, the electronic device 10 may perform operation 1220 including detecting the first direction based on at least part of the received user utterance.

Afterward, the electronic device 10 may perform operation 1230 including moving based on the first direction. According to an embodiment, in operation 1230, the electronic device 10 may move at least part of the housing 110, using the driving part 160 provided in the housing 110. According to another embodiment, the housing 110 may include the head portion 111 and the body portion 112; the driving part 160 may include the first driving part 161 for moving the body portion 112 and the second driving part 162 for moving the head portion 111. Herein, in operation 1230, the electronic device 10 may move at least part of the housing 110 of the electronic device 10 by controlling the first driving part 161. Also, according to an embodiment, in operation 1230, the electronic device 10 may move at least part of the housing 110 of the electronic device 10 at the first speed.

Figure 13:
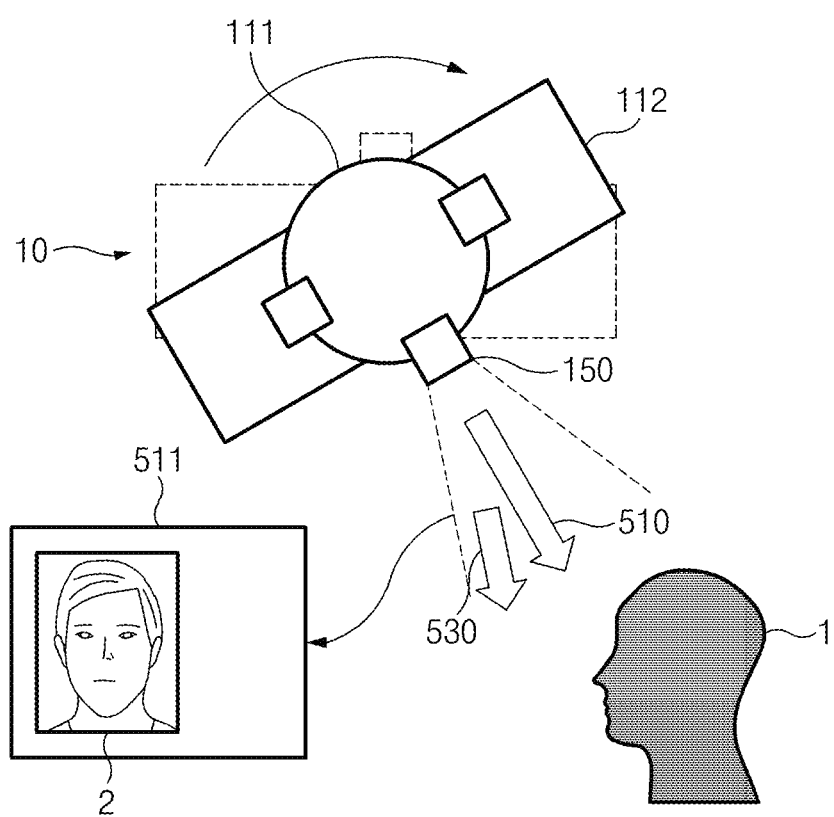
FIG. 13 is a conceptual for describing a method of determining a direction when an image scan result of an electronic device indicates that a user is detected, according to an embodiment.

Referring to FIG. 13, the electronic device 10 may move the body portion 112 such that the camera 150 faces the first direction 510. Herein, the head portion 111 may be mounted in the body portion 112 so as to move together with the body portion 112.

Afterward, the electronic device 10 may perform operation 1240 including performing a first image scan in the first direction. Referring to FIG. 13, the electronic device 10 may obtain the image 511 via the camera 150 and may recognize an object 2 (e.g., a face) obtained by capturing the user 1 in the image 511.

Afterward, the electronic device 10 may perform operation 1250 including determining the third direction based on the image obtained through the first image scan. For example, Referring to FIG. 13, when the object 2 is recognized within the image 511, the electronic device 10 may determine a third direction 530 that allows that the object 2 to be positioned at the center of the image 511 by moving the camera 150.

For example, in operation 1240, the electronic device 10 may recognize one or more faces within the image. Furthermore, the electronic device 10 may extract voice feature information from the user utterance received in operation 1210 and may search for face feature information stored in association with the voice feature information. For example, the electronic device 10 may transmit the voice feature information to an external server and then may receive the found result as a response; alternatively, the electronic device 10 may search for the face feature information stored in the memory (e.g., the memory 130 of FIG. 2, the memory 130 of FIG. 3, or the memory 1730 of FIG. 17) of the electronic device 10, using the voice feature information. Herein, the electronic device 10 may detect the face (i.e., the face matched with the found face feature information) of the user of the user utterance received in operation 1210 among the recognized one or more faces. The electronic device 10 may determine a third direction that allows the detected face to be located at a specific location (e.g., image center) within the image. For example, the third direction may refer to a direction that causes the head portion (111 of FIG. 1) equipped with a camera (150 of FIG. 1) in the electronic device (10 of FIG. 1) or the whole electronic device 10 to move as if the electronic device looks at a user.

Figure 14:
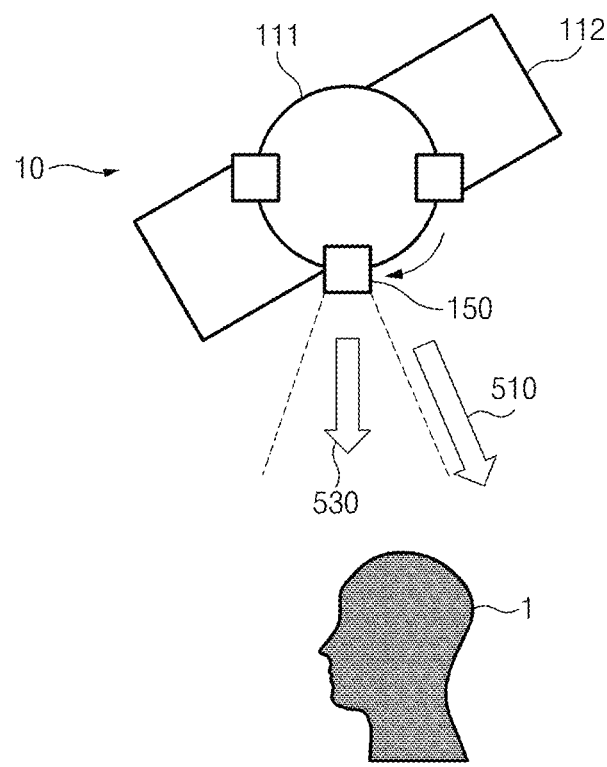
FIG. 14 is a conceptual diagram illustrating an operation in which an electronic device moves and/or rotates in a direction determined by an image scan result, according to an example embodiment.

Afterward, the electronic device 10 may perform operation 1260 including moving at least part of the housing based on the determined third direction. For example, referring to FIG. 14, the electronic device 10 may move the head portion 111 by controlling the second driving part 162 such that the camera 150 faces the third direction 530. For another example, the electronic device 10 may move the body portion 112 at the second speed such that the camera 150 faces a third direction.

Afterward, the electronic device 10 may perform operation 1270 including performing the second image scan in the third direction, using the camera 150. The electronic device 10 may perform operation 1280 including determining whether the location of the object 2 recognized as a user within the image obtained in operation 1270 is within a specified range. When the location of the object 2 is not within the specified range, the electronic device 10 may repeatedly perform operation 1250 to operation 1280 until the location of the object 2 detected within the image is within the specified range. For example, until the face of the user recognized within the image is centered in the image, the electronic device 10 may control the driving part 160 such that the direction that the camera 150 faces is moved.

Figure 15:
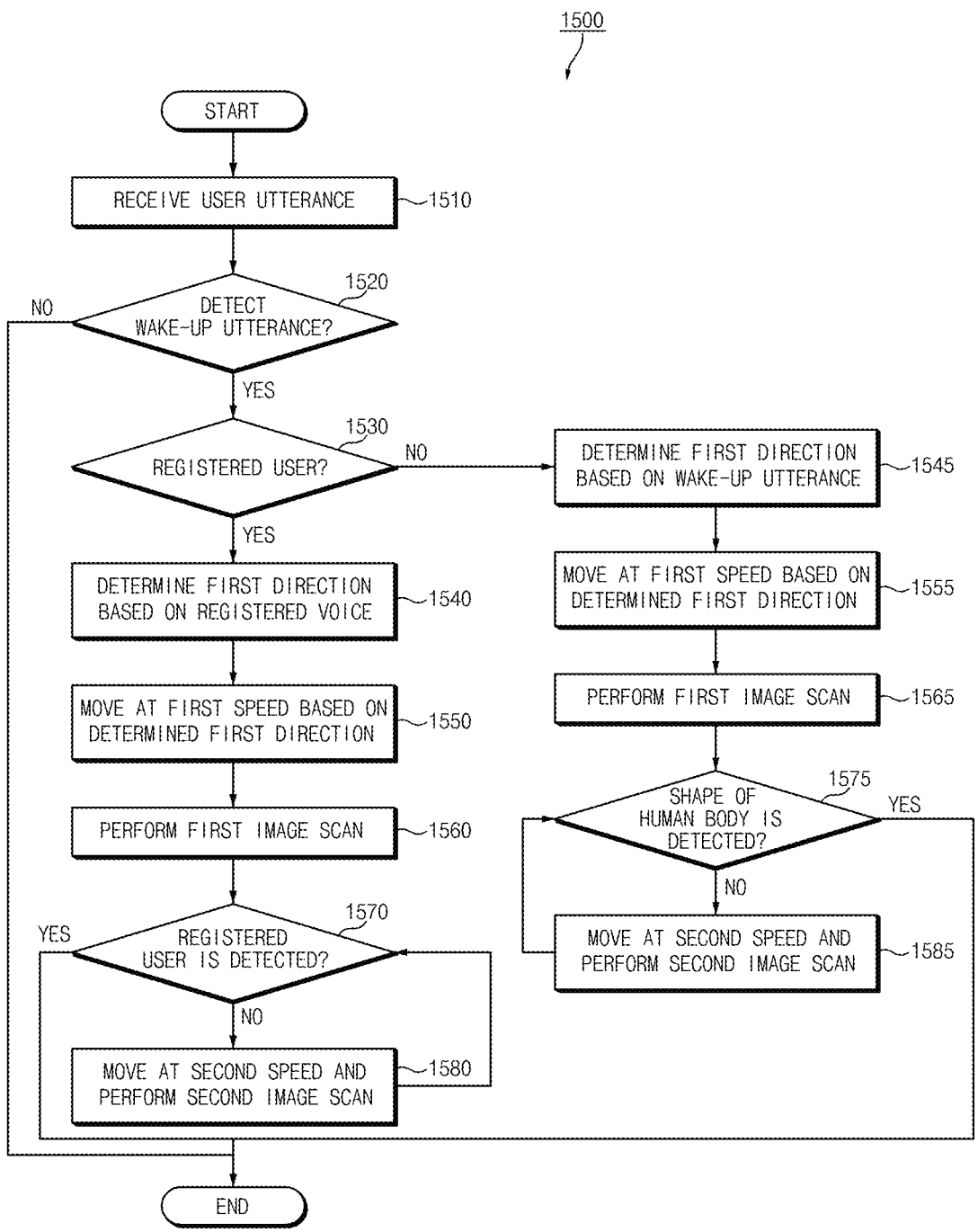
FIG. 15 is a flowchart for describing a process in which an electronic device performs an operation according to a user, according to another embodiment.

FIG. 15 is a flowchart 1500 for describing a process in which the electronic device 10 performs an operation according to a user, according to another embodiment.

The electronic device 10 may perform operation 1510 of receiving a user utterance, using the microphones 140. Afterward, the electronic device 10 may perform operation 1520 of detecting a wake-up utterance from the user utterance.

When the wake-up utterance is detected in operation 1520, the electronic device 10 may perform operation 1530 of determining whether a user who utters the user utterance received in operation 1510 is a registered user. For example, the electronic device 10 may extract voice feature information from the wake-up utterance. The electronic device 10 may search for whether information matched with the extracted voice feature information is stored.

When it is determined that the user who utters the wake-up utterance is the registered user, the electronic device 10 may perform operation 1540 of determining a first direction in which the registered voice is predicted as being received. Afterward, the electronic device 10 may perform operation 1550 of moving at least part of the housing at a first speed based on the determined first direction and operation 1560 of performing a first image scan in the first direction.

Afterward, the electronic device 10 may perform operation 1570 of determining whether the registered user is detected within the image obtained in operation 1560. For example, the electronic device 10 may search for image feature information (e.g., face feature information) stored in association with information matched with the voice feature information extracted from the wake-up utterance. When an object having the feature matched with the found image feature information is included in the image, the electronic device 10 may determine that the registered user is detected through the image scan.

When the registered user is not detected in operation 1570, the electronic device 10 may perform operation 1580 of moving at least part of the housing 110 at a second speed and performing a second image scan. Until the registered user is detected in the image obtained through the image scan result, the electronic device 10 may repeatedly perform operation 1570 and operation 1580.

When it is determined in operation 1530 that the user who utters the wake-up utterance is not the registered user, the electronic device 10 may perform operation 1545 of determining the first direction based on the wake-up utterance. Afterward, the electronic device 10 may perform operation 1555 of moving at least part of the housing 110 at the first speed based on the first direction. Moreover, the electronic device 10 may perform operation 1565 of the first image scan in the moved first direction.

Afterward, the electronic device 10 may perform operation 1575 of determining whether the shape of a human body is detected in the image obtained in operation 1565. For example, the electronic device 10 may determine whether there is information matched by comparing the information defining the feature of the general shape of a human body with the extracted feature information in the obtained image. When the shape of a human body is not detected in the image, the electronic device 10 may perform operation 1585 of moving at least part of the housing at the second speed and performing the second image scan.

Figure 16:
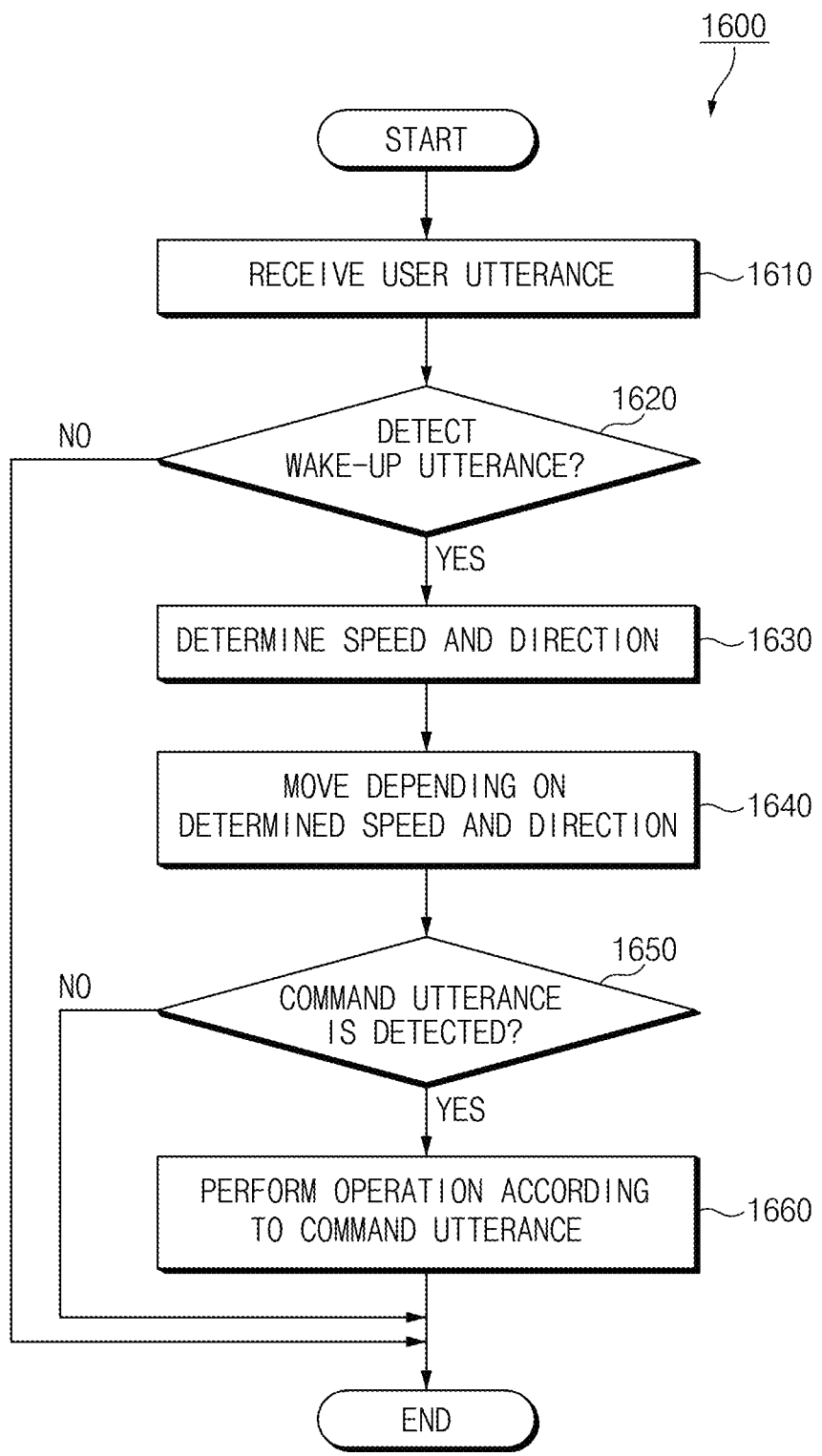
FIG. 16 is a flowchart for describing a process in which an electronic device performs an operation according to a command of a user, according to another embodiment.

FIG. 16 is a flowchart 1600 for describing a process in which the electronic device 10 performs an operation according to a command of a user, according to another embodiment.

First of all, the electronic device 10 may perform operation 1610 of receiving a user utterance, using the microphones 140. Afterward, the electronic device 10 may perform operation 1620 of determining whether a wake-up utterance is detected from the received user utterance.

When the wake-up utterance is detected, the electronic device 10 may perform operation 1630 of determining the speed and direction for moving at least part of the housing 110. For example, the electronic device 10 may determine the direction of a user based on at least one of a voice and an image. According to an embodiment, the determined speed and direction may include the speed and direction of each of the driving body 165 operated by the first driving part 161 and the head portion 111 moved by the second driving part 162. Afterward, in operation 1640, the electronic device 10 may move at least part of the housing 110 depending on the determined speed and direction.

Furthermore, the electronic device 10 may perform operation 1650 of determining whether a command utterance is detected within a predetermined waiting time after the user utterance, in which the wake-up utterance is detected, is received. When the command utterance is detected within the waiting time in operation 1650, the electronic device 10 may perform operation 1660 according to the command utterance.

According to an embodiment, operation 1660 according to the command utterance may include an operation of moving at least part of the housing 110 depending on the speed and direction determined based on the command utterance. According to an embodiment, the electronic device 10 may determine a direction in which at least part of the housing 110 is moved depending on the command utterance, based on at least one of a voice and an image. For example, when the electronic device 10 receives the command saying that 'clean the front of a chair on my right side', the electronic device 10 may perform an operation of moving to the right of the user's direction determined based on speech recognition until an image including a shape recognized as a chair is scanned.

Figure 17:
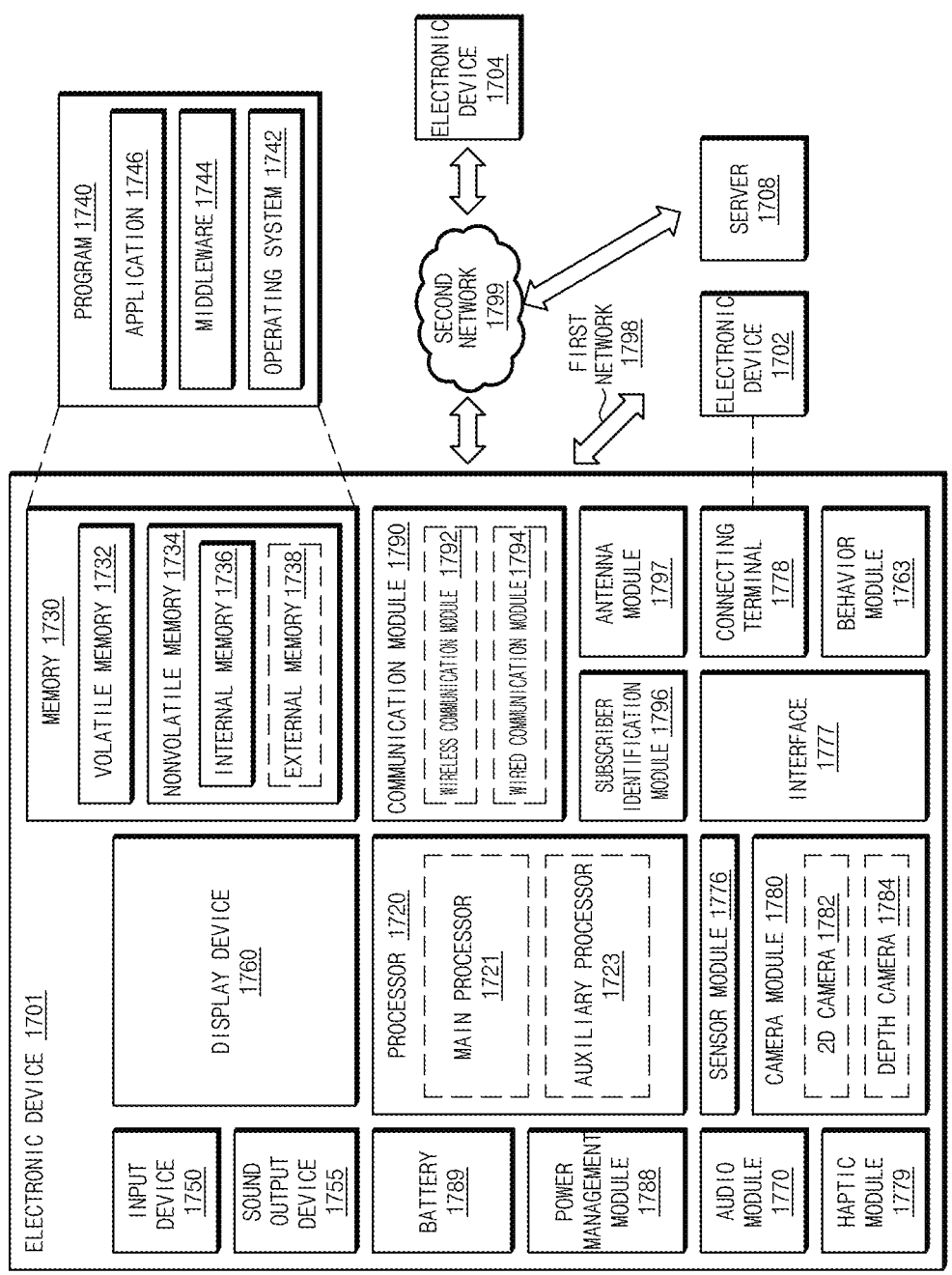
FIG. 17 illustrates an electronic device in a network environment according to certain embodiments.

FIG. 17 is a block diagram of an electronic device 1701 in a network environment 1700, according to certain embodiments.

Referring to FIG. 1, an electronic device 1701 in a network environment 1700 may communicate with an electronic device 1702 over a first network 1798 (e.g., a short range wireless communication) or may communicate with an electronic device 1704 or a server 1708 over a second network 1799 (e.g., a long range wireless communication). The electronic device 1701 may communicate with the electronic device 1704 through the server 1708. According to an embodiment, the electronic device 1701 may include a processor 1720, a memory 1730, an input device 1750, a sound output device 1755, a display device 1760, a behavior module 1763, an audio module 1770, a sensor module 1776, an interface 1777, a haptic module 1779, a camera module 1780, a power management module 1788, a battery 1789, a communication module 1790, a subscriber identification module 1797, or an antenna module 1797. In any embodiment, the electronic device 1701 may not include at least one (e.g., the display device 1760 or the camera module 1780) of the above-described components or may further include one or more other components. In any embodiment, some of the components may be implemented as a single integrated circuit. For example, the sensor module 1776 (e.g., a fingerprint sensor, an iris sensor, or an illuminance sensor) may be implemented while being embedded in the display device 1760 (e.g., a display).

For example, the processor 1720 may execute software (e.g., a program 1740) to control at least another component (e.g., hardware or software component) of the electronic device 1701 connected to the processor 1720, and may process and calculate various types of data. According to an embodiment, as at least part of data processing or calculation, the processor 1720 may load instructions or data received from other components (e.g., the sensor module 1776 or the communication module 1790) into the volatile memory 1732, may process instructions or data stored in the volatile memory 1732, and may store the result data in the nonvolatile memory 1734. According to an embodiment, the processor 1720 may include a main processor 1721 (e.g., a central processing unit or an application processor) and an auxiliary processor 1723 (e.g., a graphic processing unit, an image signal processor, a sensor hub processor, or a communication processor) capable of operating independently or together with the main processor. Additionally or alternatively, the auxiliary processor 1723 may use lower power than main processor 1721 or may be configured to be specialized to a specified function. The auxiliary processor 1723 may be implemented separately from the main processor 1721 or as part of the main processor 1721.

For example, the auxiliary processor 1723 may control at least part of the functions or states associated with at least one (e.g., the display device 1760, the sensor module 1776, or the communication module 1790) of the components of the electronic device 1701, instead of the main processor 1721 while the main processor 1721 is in an inactive (e.g., sleep) state or together with the main processor 1721 while the main processor 1721 is in an active (e.g., the execution of an application) state. According to an embodiment, the auxiliary processor 1723 (e.g., an image signal processor or a communication processor) may be implemented as a part of operatively associated other components (e.g., the camera module 1780 or the communication module 1790).

The memory 1730 may store various pieces of data used by at least one component (e.g., the processor 1720 or the sensor module 1776) of the electronic device 1701. For example, data may include software (e.g., the program 1740) and input data or output data for instructions associated with the software. The memory 1730 may include, for example, the volatile memory 1732 or the nonvolatile memory 1734.

The program 1740 may be stored as software in the memory 1730 and may include, for example, an operating system 1742, a middleware 1744, or an application 1746.

The input device 1750 may receive instructions or data to be used for the component (e.g., the processor 1720) of electronic device 1701, from the outside (e.g., a user) of the electronic device 1701. The input device 1750 may include a microphone, a mouse, or a keyboard.

The sound output device 1755 may output a sound signal to the outside of the electronic device 1701. The sound output device 1755 may include, for example, a speaker or a receiver. The speaker may be used for a general purpose, such as multimedia play or recording play, and the receiver may be used to receive an incoming call. According to an embodiment, the receiver may be implemented separately from the speaker or may be implemented as a part of the speaker.

The display device 1760 may visually provide information to the outside (e.g., the user) of the electronic device 1701. The display device 1760 may include, for example, a display, a hologram device, or a projector and a control circuit for controlling a corresponding device. According to an embodiment, the display device 1760 may include a touch circuitry configured to sense a touch, or a sensor circuitry (e.g., a pressure sensor) configured to measure the strength of force generated by the touch.

The behavior module 1763 may perform face change expression, posture expression, or driving. According to an embodiment, the behavior module 1763 may include a facial expression motor, a posture expression motor, or a driver. For example, the facial expression motor may visually provide the state of the electronic device 1701 through the display device 1760. For example, the driver may be used to move the electronic device 1701 or to mechanically change other components. For example, the driver may be a form capable of moving up/down or left/right or rotating clockwise/counterclockwise, about at least one axis. For example, the driver may be implemented in combination with a drive motor (e.g., wheel-type casters, sphere-type wheels, continuous tracks, or propellers) or may be implemented by independently controlling the drive motor.

The audio module 1770 may convert sound to an electrical signal, or reversely, may convert an electrical signal to sound. According to an embodiment, the audio module 1770 may obtain sound through the input device 1750, or may output sound through the sound output device 1755, or through an external electronic device (e.g., the electronic device 1702) (e.g., a speaker or a headphone) directly or wirelessly connected with the electronic device 1701.

The sensor module 1776 may sense an operation state (e.g., power or a temperature) of the electronic device 1701 or an external environment state (e.g., a user state), and may generate an electrical signal or a data value corresponding the sensed state. According to an embodiment, the sensor module 1776 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1777 may support one or more specified protocols that may be used to directly and wirelessly connect the electronic device 1701 with an external electronic device (e.g., the electronic device 1702). According to an embodiment, the interface 1777 may include, for example, a high definition multimedia interface (HDMI), a universal serial bus (USB) interface, a secure digital (SD) card interface, or an audio interface.

A connecting terminal 1778 may include a connector that may allow the electronic device 1701 to be physically connected with an external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal to a mechanical stimulation (e.g., vibration or movement) or an electrical stimulation which the user may perceive through the sense of touch or the sense of movement. According to an embodiment, the haptic module 1779 may include, for example, a motor, a piezoelectric sensor, or an electrical stimulation device.

The camera module 1780 may photograph a still image and a video. According to an embodiment, the camera module 1780 may include one or more lenses, image sensors, image signal processors, or flashes (or electrical flashes). According to an embodiment, the camera module 1780 may include a 2D camera 1782 or an infrared-based depth camera 1784.

The power management module 1788 may manage the power which is supplied to the electronic device 1701. According to an embodiment, the power management module 1688 may be implemented, for example, as at least part of a power management integrated circuit (PMIC).

The battery 1789 may power at least one component of the electronic device 1701. According to an embodiment, the battery 1789 may include, for example, a primary cell not rechargeable, a secondary cell rechargeable, or a fuel cell.

The communication module 1790 may establish a direct (or wired) communication channel or a wireless communication channel between the electronic device 1701 and an external electronic device (e.g., the electronic device 1702, the electronic device 1704, or the server 1708) and may perform communication through the established communication channel. The communication module 1790 may include one or more communication processors which are operated independently of the processor 1720 (e.g., an application processor) and support direct (or wired) communication or wireless communication. According to an embodiment, the communication module 1790 may include a wireless communication module 1792 (e.g., a cellular communication module, a short range wireless communication module, or a global navigation satellite system (GNSS) communication module) or a wired communication module 1794 (e.g., a local area network (LAN) communication module or a power line communication module). A corresponding communication module of such communication modules may communicate with an external electronic device over the first network 1798 (e.g., a short range communication network such as Bluetooth, Wi-Fi direct, or infrared data association (IrDA)) or the second network 1799 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1792 may identify and authenticate the electronic device 1701 within a communication network, such as the first network 1798 or the second network 1799, by using subscriber information (e.g., international mobile subscriber identity (IMSI)) stored in the subscriber identification module 1796.

The antenna module 1797 may transmit a signal or a power to the outside (e.g., an external electronic device) or may receive a signal or a power from the outside. According to an embodiment, the antenna module may be formed of a conductor or a conductive pattern; according to some embodiments, the antenna module may further include other parts (e.g., RFICs), in addition to the conductor or the conductive pattern. According to an embodiment, the antenna module 1797 may include one or more antennas; As such, at least one antenna suitable for a communication scheme used in a communication network such as the first network 1798 or the second network 1799 may be selected, for example, by the communication module 1790. The signal or power may be exchanged between the communication module 1790 and an external electronic device through the selected at least one antenna or may be received from the external electronic device through the selected at least one antenna and the communication module 190.

At least part of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1701 and the external electronic device 1704 through the server 1708 connected to the second network 1799. Each of the electronic devices 1702 and 104 may be a device of which the type is different from or the same as that of the electronic device 1701. According to an embodiment, all or a part of operations to be executed in the electronic device 1701 may be executed in one or more external devices of the external electronic devices 1702, 1704, or 1708. For example, in the case where the electronic device 1701 should perform any function or service automatically or in response to a request from the user or any other device, the electronic device 1701 may additionally request one or more external electronic devices to perform at least part of the function or service, instead of internally executing the function or service. The one or more external electronic devices which receive the request may execute at least a part of the function or service thus requested or an additional function or service associated with the request, and may provide a result of the execution to the electronic device 1701. The electronic device 1701 may process received result as it is or additionally, and may provide a result of the processing as at least a part of the response to the request. To this end, for example, a cloud computing, distributed computing, or client-server computing technology may be used.

Figure 18:
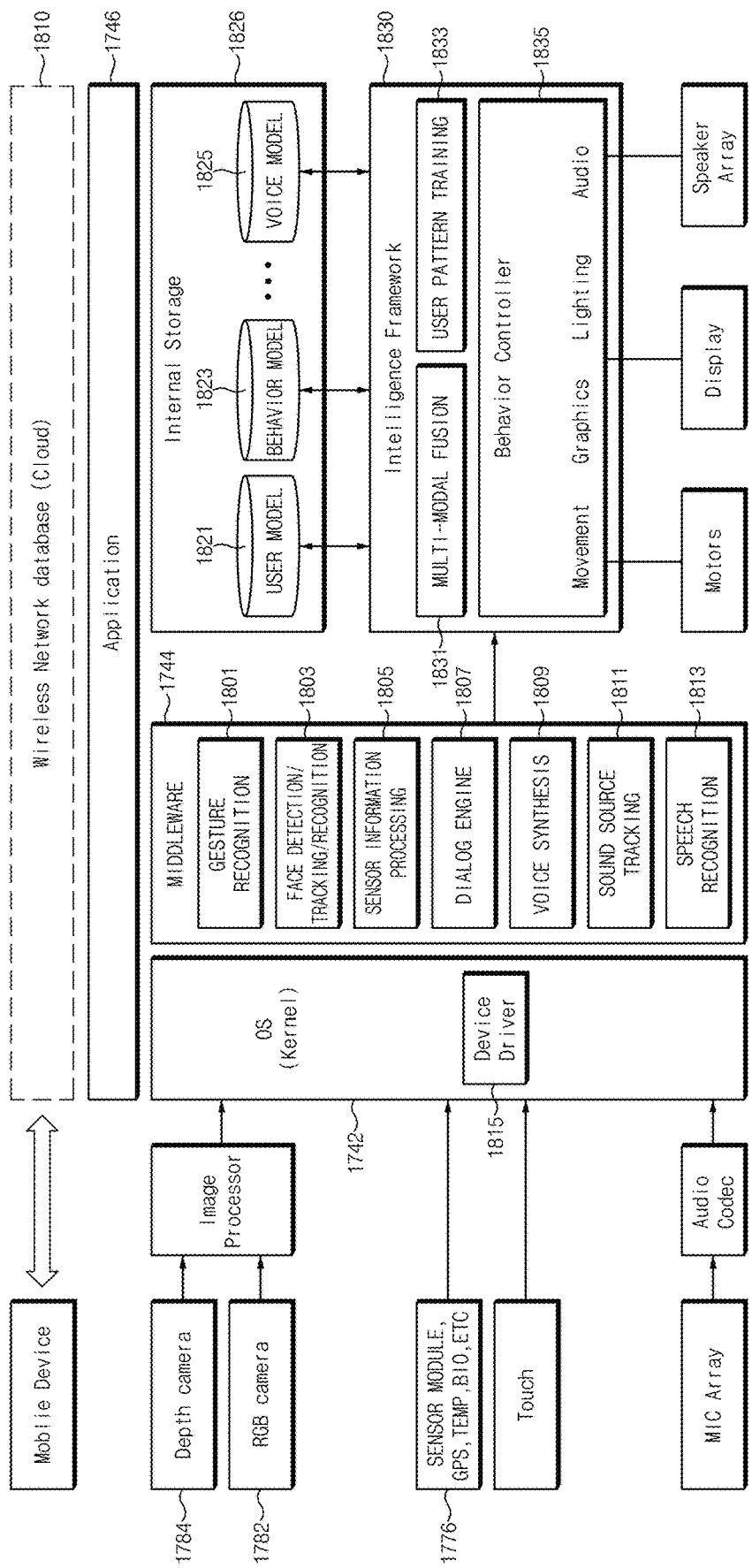
FIG. 18 is a software block diagram, according to certain embodiments of the disclosure.

FIG. 18 is a software block diagram, according to certain embodiments of the disclosure. Referring to FIG. 18, the software of an electronic device (e.g., 1701 of FIG. 17) may include an operating system (OS) 1742 for controlling one or more resources of the electronic device, middleware 1744, an intelligent framework 1830, or internal storage 1826. The OS may include, for example, Android™, iOS™, Windows™, Symbian™, Tizen™, or Bada™. For example, at least part of software programs may be preloaded onto the electronic device when the electronic device is being manufactured; alternatively, when the electronic device is used by a user, at least part of software programs may be downloaded from an external electronic device (e.g., the electronic device 1702 or 1704) or a server 1708 or may be updated.

The OS 1742 may control the management (e.g., allocating or retrieving) of one or more system resources (e.g., a process, a memory, or a power) of the electronic device. Additionally or alternatively, the OS 1742 may include one or more driver programs 1815 for driving any other hardware devices of the electronic device 1701, for example, the input device 1750, the sound output device 1755, the display device 1760, the behavior module 1763, the audio module 1770, the sensor module 1776, the interface 1777, the haptic module 1779, the camera module 1780, the power management module 1788, the battery 1789, the communication module 1790, the subscriber identification module 1796, or the antenna module 1797.

The middleware 1744 may detect and track the location of the user's face, using the signal-processed data or may perform authentication through face recognition. The middleware 1744 may recognize the 3D gesture of the user, may track the input location (Direct of Arrival (DOA)) for the audio signal, and may process the signal of the speech recognition and various pieces of sensor data. For example, the middleware 1744 may include a gesture recognition manager 1801, a face detection/tracking/recognition manager 1803, a sensor information processing manager 1805, a dialog engine manager 1807, a voice synthesis manager 1809, a sound source tracking manager 1811, or a speech recognition manager 1813.

For example, the intelligent framework 1830 may include a multi-modal fusion block 1831, a user pattern training block 1833, or a behavior control block (e.g., a behavior controller) 1835. For example, the multi-modal fusion block 1831 may collect and manage various pieces of information processed by the middleware 1744. For example, the user pattern training block 1833 may extract and train meaningful information such as a user's life pattern, preference, or the like, using the information of the multi-modal fusion block. For example, the behavior control block 1835 may represent information to be fed back to the user by the electronic device (e.g., 1701 of FIG. 17) through movement, graphic UI/UX, light, a voice response, or a sound.

For example, the internal storage 1826 may include a user model DB 1821, a behavior model DB 1823, or a voice model DB 1825. For example, the user model DB 1821 may store information trained by the intelligent framework 1830 for each user. For example, the behavior model DB 1823 may store information for controlling the behavior of the electronic device. For example, pieces of information stored in each DB may be stored in or shared with a wireless network DB (e.g., cloud) 1810.

The electronic device according to certain embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Certain embodiments of the disclosure and terms used herein are not intended to limit the technical features described in the disclosure to specific embodiments, and it should be understood that the embodiments and the terms include modification, equivalent, or alternative on the corresponding embodiments described herein. With regard to description of drawings, similar or related components may be marked by similar reference marks/numerals. The singular form of the noun corresponding to an item may include one or more of items, unless interpreted otherwise in context. In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first" or "second" may be used to simply distinguish the corresponding component from the other component, but do not limit the corresponding components in other aspects (e.g., importance or order). When a component (e.g., a first component) is referred to as being "coupled with/to" or "connected to" another component (e.g., a second component) with or without the term of "operatively" or "communicatively", it may mean that a component is connectable to the other component, directly (e.g., by wire), wirelessly, or through the third component.

The term "module" used herein may include a unit, which is implemented with hardware, software, or firmware, and may be interchangeably used with the terms "logic", "logical block", "part", "circuit", or the like. The "module" may be a minimum unit of an integrated part or may be a minimum unit of the part for performing one or more functions or a part thereof. For example, according to an embodiment, the module may be implemented in the form of an application-specific integrated circuit (ASIC).

Certain embodiments of the disclosure may be implemented with software (e.g., program 1740) including one or more instructions stored in a storage medium (e.g., the internal memory 1736 or the external memory 1738) readable by a machine (e.g., the electronic device 1701). For example, the processor (e.g., the processor 1720) of the machine (e.g., the electronic device 1701) may call at least one instruction of the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily.

According to an embodiment, a method according to certain embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product may be at least temporarily stored in the machine-readable storage medium such as the memory of a manufacturer's server, an application store's server, or a relay server or may be generated temporarily.

According to certain embodiments, each component (e.g., a module or a program) of the above-described components may include a single entity or a plurality of entities. According to certain embodiments, one or more the components of the above-described components or operations may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to certain embodiments, operations executed by modules, program, or other components may be executed by a successive method, a parallel method, a repeated method, or a heuristic method, or one or more of the operations may be executed in different sequences or omitted. Alternatively, one or more other operations may be added.

Certain embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When a (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 30).

The term "module" used in this specification may include a unit implemented with hardware, software, or firmware. For example, the term "module" may be interchangeably used with the term "logic", "logic block", "component", "circuit", and the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to certain embodiments, at least a part of an apparatus (e.g., modules or functions thereof) or a method (e.g., operations) may be, for example, implemented by instructions stored in a computer-readable storage media (e.g., the memory 30) in the form of a program module. The instruction, when executed by a processor (e.g., a processor 20), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to certain embodiments may be implemented using single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to certain embodiments, operations executed by modules, program modules, or other elements may be executed by a successive method, a parallel method, a repeated method, or a heuristic method, or at least one part of operations may be executed in different sequences or omitted. Alternatively, other operations may be added.

According to embodiments disclosed in the specification, an electronic device capable of accurately and quickly facing a user.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a housing;
at least one camera disposed at least partially within the housing;
a plurality of microphones configured to detect a direction of a sound source;
at least one driver operable to rotate and/or move at least part of the housing;
a wireless communication circuit disposed within the housing;
a processor operatively connected to the camera, the microphones, the driver, and the wireless communication circuit; and
a memory operatively connected to the processor,
wherein the memory stores instructions that, when executed, cause the processor to:
receive a user utterance using the plurality of microphones;
detect at least two potential directions from which the user utterance originated, based on at least part of the user utterances;
calculate a reliability value for each of the at least two potential directions;

wherein the at least two potential directions include a first direction and a second direction, wherein the reliability value for the first direction is greater than the reliability value for the second direction;

control the driver to rotate and/or move at least part of the housing towards the first direction;

after the rotation and/or the movement towards the first direction, perform a first image scan for the first direction, by capturing an image using the camera while the camera is oriented in the first direction and analyzing the image for a presence of a user;

when the user is not detected in the image, control the driver to rotate and/or move the at least part of the housing in the second direction; and perform a second image scan for the second direction.

2. The electronic device of claim 1, wherein: after the first direction is detected, controlling the driver to rotate and/or move further includes controlling the rotation and/or the movement of the housing towards the first direction at a first rotational speed and/or first movement velocity.

3. The electronic device of claim 2, wherein the instructions cause the processor to:

when the user is not detected in the image, control the rotation and/or the movement of the housing in the second direction and at a second rotational speed and/or second movement velocity different than the first rotational speed and/or first movement velocity.

4. The electronic device of claim 3, wherein the second rotational speed is less than the first rotational speed.

5. The electronic device of claim 1, wherein the driver includes a motor and/or a wheel.

6. The electronic device of claim 1, wherein the memory further stores a prespecified wake-up utterance, and the processor is further configured to:

based on detecting reception of the wake-up utterance, configure the electronic device receive a command utterance.

7. The electronic device of claim 6, wherein the command utterance includes the user utterance, and the user utterance is received after the electronic device is configured to receive the command utterance.

8. The electronic device of claim 1, wherein when the user is not detected in the first direction, the instructions further cause the processor to:

generate a prompt requesting input of an additional user utterance; and after receiving the additional user utterance through the plurality of microphones, detect whether a first voice feature indicated in the user utterance matches a second voice feature indicated in the additional user utterance, wherein the second direction is detected based on at least part of the additional user utterance when the first voice feature matches the second voice feature.

9. A method for controlling an electronic device, the method comprising:

receiving a user utterance using a plurality of microphones;

detecting at least two potential directions from which the user utterance originated based on at least part of the user utterance;

calculate a reliability value for each of the at least two potential directions;

wherein the at least two potential directions include a first direction and a second direction, wherein the reliability value for the first direction is greater than the reliability value for the second direction;

rotating and/or moving, by a driver, at least part of the electronic device towards the first direction from which the user utterance is detected, based on at least part of the user utterance;

after rotating and/or the moving towards the first direction, performing a first image scan in the first direction using a camera;

when a user of the user utterance is not detected in the first direction by the first image scan, rotating and/or moving, by the driver, at least part of the electronic device in the second direction; and performing a second image scan in the second direction using the camera.

10. The method of claim 9, wherein the moving the at least part of the electronic device in the first direction includes:

rotating and/or moving the at least part of the electronic device at a first speed, and wherein the rotating and/or the moving of the at least part of the electronic device in the second direction includes:

rotating and/or moving the at least part of the electronic device at a second speed different than the first speed.

* * * * *